US012807744B2

(12) United States Patent
Ito et al.

(10) Patent No.: US 12,807,744 B2
(45) Date of Patent: Nov. 24, 2026

(54) BRANCHED PROPYLENE-BASED POLYMER AND PRODUCTION METHOD THEREFOR

(71) Applicant: JAPAN POLYPROPYLENE CORPORATION, Tokyo (JP)

(72) Inventors: Masaaki Ito, Mie (JP); Jun Shinozaki, Mie (JP); Tomoki Uchida, Mie (JP); Miori Takizawa, Mie (JP)

(73) Assignee: JAPAN POLYPROPYLENE CORPORATION, Tokyo (JP)

( * ) Notice: Subject to any disclaimer, the term of this patent is extended or adjusted under 35 U.S.C. 154(b) by 514 days.

(21) Appl. No.: 18/283,127

(22) PCT Filed: Mar. 11, 2022

(86) PCT No.: PCT/JP2022/010990

§ 371 (c)(1),
(2) Date: Sep. 20, 2023

(87) PCT Pub. No.: WO2022/209773

PCT Pub. Date: Oct. 6, 2022

(65) Prior Publication Data

US 2024/0182609 A1 Jun. 6, 2024

(30) Foreign Application Priority Data

Mar. 29, 2021 (JP) ................................ 2021-055552

(51) Int. Cl.
*C08F 110/06* (2006.01)
*C08F 2/00* (2006.01)
(Continued)

(52) U.S. Cl.
CPC ............ *C08F 110/06* (2013.01); *C08F 2/001* (2013.01); *C08F 4/6492* (2013.01); *C08F 4/65904* (2013.01); *C08F 4/65927* (2013.01)

(58) Field of Classification Search
CPC ...... C08F 110/06; C08F 2/001; C08F 4/6492; C08F 4/65904; C08F 4/65927
See application file for complete search history.

(56) References Cited

U.S. PATENT DOCUMENTS

2018/0319907 A1* 11/2018 Hagadorn ............ C08F 4/6495
2023/0174758 A1 6/2023 Uchida et al.

FOREIGN PATENT DOCUMENTS

JP 10-338717 A 12/1998
JP 2001-525460 A 12/2001
(Continued)

OTHER PUBLICATIONS

The Extended European Search Report that issued in European Patent Application No. 22779994.7, dated Aug. 23, 2024.
(Continued)

*Primary Examiner* — Shane Fang
(74) *Attorney, Agent, or Firm* — Greenblum & Bernstein, P.L.C.

(57) ABSTRACT

A branched propylene-based polymer having the following properties (1) to (5):

property (1): MFR of 10 g/10 min to 100 g/10 min;

property (2): Mw/Mn is 2.5 or more and less than 3.5; Mz/Mw is 3.0 to 4.7; and Mz is $50.0\times10^4$ to $94.0\times10^4$;

property (3): in an integral molecular weight distribution curve obtained by GPC, a percentage of a component having a molecular weight of $100\times10^4$ or more, is 1.5 mass to 4.0 mass %;

property (4): in a molecular weight distribution curve obtained by 3D-GPC, a branching index $g'(100\times10^4)$ at an absolute molecular weight $M_{abs}$ of $100\times10^4$ is more than 0.70 and 0.85 or less; and property (5): a ratio [η*(0.01)η*(100)] between a complex viscosity η*(0.01) and a complex viscosity (Continued)

η*(100) in dynamic viscoelasticity measurement, is 4.0 to 20, and η*(0.01)/η*(100) and the MFR satisfy specific relations.

9 Claims, 2 Drawing Sheets

(51) Int. Cl.

| | |
|---|---|
| ***C08F 4/649*** | (2006.01) |
| ***C08F 4/659*** | (2006.01) |
| ***C08F 4/6592*** | (2006.01) |

(56) References Cited

FOREIGN PATENT DOCUMENTS

| | | | |
|---|---|---|---|
| JP | 2002-523575 | A | 7/2002 |
| JP | 2007-154121 | A | 6/2007 |
| JP | 2009-533540 | A | 9/2009 |
| JP | 2009-275207 | A | 11/2009 |
| JP | 2015-193827 | A | 11/2015 |
| JP | 2020-189966 | A | 11/2020 |
| WO | 99/29742 | A1 | 6/1999 |
| WO | 00/12572 | A1 | 3/2000 |
| WO | 2007/118698 | A1 | 10/2007 |
| WO | 2021/246338 | A1 | 12/2021 |

OTHER PUBLICATIONS

International Search Report Issued in International Patent Application No. PCT/JP2022/010990, dated May 17, 2022, along with an English translation thereof.

International Preliminary Report on Patentability issued in International Patent Application No. PCT/JP2022/010990, dated Oct. 3, 2023, along with an English translation thereof.

Office Action that issued in European Patent Application No. 22779994.7, dated Oct. 9, 2026.

* cited by examiner

BRANCHED PROPYLENE-BASED POLYMER AND PRODUCTION METHOD THEREFOR

TECHNICAL FIELD

The present invention relates to a branched propylene-based polymer and a production method therefor. In particular, the present invention relates to a branched propylene-based polymer which shows small strain hardening in the low deformation rate range while retaining a necessary melt tension for molding, and it shows a large difference between the strain hardening in the low deformation rate range and the strain hardening in the high deformation rate range. In addition, the present invention relates to a method for producing the branched propylene-based polymer.

BACKGROUND ART

Polypropylene is characterized by small specific gravity, excellent chemical resistance, excellent recycling efficiency, and non-production of toxic gas when incinerated. On the other hand, polypropylene has low melt tension and needs to be improved in moldability such as extrusion molding and thermoforming.

In recent years, much research has been conducted to improve melt tension by introducing a branched structure to polypropylene and improve moldability such as sheet molding, sheet foam molding, injection foam molding, blow molding, extrusion lamination molding and thermoforming.

As a method for introducing a branched structure to polypropylene, a macromer copolymerization method using a metallocene catalyst has been recently proposed. A branched propylene-based polymer obtained by the macromer copolymerization method is advantageous in that gel production owing to a crosslinking reaction is small compared to polypropylene to which a branched structure has been introduced by irradiation with electron beam or the like.

As the branched propylene-based polymer obtained by the macromer copolymerization method, a polymer having a branching index g' of less than 0.93 is disclosed in Patent Document 1, which is obtained by the polymerization's first step (a macromer synthesis process) for producing a vinyl structure at a terminal and the polymerization's second step (a macromer copolymerization process) for copolymerizing propylene and the propylene macromer. A propylene homopolymer is disclosed in Patent Document 2, which is characterized as follows: it satisfies the relation of $MI_5/MI_{2.16} \geq 0.240 \times Mw/Mn + 3.1$ (where $MI_5/MI_{2.16}$ is the ratio between melt index $MI_5$ (g/10 min) at a load of 5.0 kg and melt index $MI_{2.16}$ (g/10 min) at a load of 2.16 kg, and Mw/Mn is the ratio between the weight average molecular weight Mw and the number average molecular weight Mn measured by gel permeation chromatography); the melt tension MS (g) and the limiting viscosity [η] (dl/g) satisfy the relation of $\log MS \geq 3.17 \times \log[\eta] - 0.68$; and the limiting viscosity [η] ranges from 0.1 dl/g to 15.0 dl/g.

Branched polypropylene having a polydispersity of 4.0 or less, a melting point of more than 90° C., and a branching index g' of less than 0.95, is disclosed in Patent Document 3, which is obtained by a single-stage polymerization method in which the macromer synthesis process and the macromer copolymerization process are implemented at the same time.

Patent Document 4 discloses a propylene homopolymer having the following properties (1) to (6), which is obtained by a method for conducting terminal vinyl production and copolymerization on a single supporting catalyst by use of a catalyst containing a specific single metallocene compound and an ion-exchange layered silicate:

(1) the weight average molecular weight (Mw) obtained by gel permeation chromatography (GPC) is from $20 \times 10^4$ to $100 \times 10^4$;

(2) the ratio (Mw/Mn) between the weight average molecular weight (Mw) and the number average molecular weight (Mn), both of which are obtained by GPC, is from 3.5 to 10.5;

(3) α/β is 1.2 or more (where $\alpha = H_{50} - Tp$; $\beta = Tp - L_{50}$; Tp denotes the common logarithm of a molecular weight corresponding to a peak position of a molecular weight distribution curve obtained by GPC; and $L_{50}$ and $H_{50}$ denote the common logarithms of molecular weights at the position 50% the height of a peak ($L_{50}$ is on the lower molecular weight side than Tp, and $H_{50}$ is on the higher molecular weight side than Tp);

(4) the mm fraction of propylene unit triad sequences obtained by $^{13}C$-NMR analysis is 90% or more;

(5) in temperature rising elution fractionation (TREF) measurement using o-dichlorobenzene as a solvent, a component eluted at a temperature of 90° C. or less is 6.0 mass $ or less; and (6) in $^{13}C$-NMR analysis of the propylene polymer, three methylene carbons (Ca, Cb and Cc) are observed from 44.0 ppm to 44.1 ppm, from 44.7 ppm to 44.8 ppm, and from 44.8 ppm to 44.9 ppm; a methine carbon (Cbr) is observed from 31.6 ppm to 31.7 ppm; and the number of the methine carbon per 1000 whole skeleton forming carbon atoms is 0.1 or more (the term "whole skeleton forming carbon atoms" means whole carbon atoms other than methyl carbons).

Patent Document 5 discloses a propylene-based polymer satisfying the following requirements (i) to (vi), which is obtained by use of a catalyst containing several specific metallocene compounds:

(i) the melt flow rate (MFR) (at a temperature of 230° C. and a load of 2.16 kg) is 0.1 g/10 min or more and 100 g/10 min or less;

(ii) the ratio (Mw/Mn) between the weight average molecular weight (Mw) and the number average molecular weight (Mn), both of which are measured by gel permeation chromatography (GPC), is 3.5 or more and 10.5 or less;

(iii) in an integral molecular weight distribution curve obtained by GPC, the percentage of a component having a molecular weight (M) of $200 \times 10^4$ or more, is 0.4 mass % or more and less than 10 mass % with respect to the total amount;

(iv) in temperature rising elution fractionation (TREF) measurement with o-dichlorobenzene (ODCB), a component eluted at a temperature of 40° C. or less, is 3.0 mass % or less;

(v) the isotactic triad fraction (mm) measured by $^{13}C$-NMR is 95% or more; and (vi) the strain hardening index (Amax) obtained in elongational viscosity measurement is 6.0 or more.

Patent Document 6 discloses polypropylenes having a multi-branching index (MBI) of at least 0.15, which shows strain rate thickening, for the purpose of obtaining high stability of their melt under extensional flow.

To obtain good dispersibility when blended with other resins and to obtain good appearance and melt-cutting heat-seal strength, Patent Document 7 discloses a propylene-based copolymer satisfying the following requirements (i) to (iv), which is obtained by use of a catalyst containing several specific metallocene compounds:

(i) the melt flow rate (MFR) (temperature 230° C. and load 2.16 kg) is 0.1 g/10 min or more and 80 g/10 min or less;

(ii) the ratio (Q value) between the weight average molecular weight (Mw) and the number average molecular weight (Mn) measured by gel permeation chromatography, is from 2.5 to 5.5;

(iii) the percentage (CXS) of a component which is soluble to p-xylene at 25° C., is 0.1 wt. % or more and less than 5.0 wt. %; and (iv) the strain hardening index (Amax) is 1.5 or more and less than 6.0 in elongational viscosity measurement.

CITATION LIST

Patent Documents

Patent Document 1: Japanese translation of PCT International Application No. 2001-525460

Patent Document 2: Japanese Patent Application Laid-Open (JP-A) No. H10-338717

Patent Document 3: Japanese translation of PCT International Application No. 2002-523575

Patent Document 4: JP-A No. 2007-154121

Patent Document 5: JP-A No. 2009-275207

Patent Document 6: Japanese translation of PCT International Application No. 2009-533540

Patent Document 7: JP-A No. 2015-193827

Technical Problem

SUMMARY OF INVENTION

All the branched propylene-based polymers disclosed in Patent Documents 1 to 5 have improved melt tension. However, the branched propylene-based polymers are likely to cause problems owing to the instability phenomenon of the fluidity of melted resin when molding. For example, in extrusion molding, draw resonance is likely to occur; in thermoforming, poor appearance is likely to be caused by the relaxation of stress concentration during raw sheet molding; and in injection molding, weld lines are likely to be formed.

The reason for these problems is thought to be because there are many components having an extraordinarily long relaxation time in the polymers. When there are many components having an extraordinarily long relaxation time in the polymers, not only the strain hardening in the high deformation rate range becomes large, but also the strain hardening in the low deformation rate range becomes large. Accordingly, it is thought that the difference between the strain hardening in the low deformation rate range and the strain hardening in the high deformation rate range becomes small, and the problems are caused.

The multi-branching index of the branched propylene-based polymers disclosed in Patent Document 6 is large; however, the strain hardening degree in the high deformation rate range is not sufficient, and the melt tension is not sufficient.

The branched propylene-based polymer disclosed in Patent Document 7 shows improved dispersibility when blended with other resins. However, the melt tension is sacrificed; the strain hardening degree in the high deformation rate range becomes small; and the difference between the strain hardening in the high deformation rate range and the strain hardening in the low deformation rate range becomes small.

An object of the present invention is to provide a branched propylene-based polymer which is configured to show small strain hardening in the low deformation rate range, while retaining a necessary melt tension for molding, and which is configured to show a large difference between the strain hardening in the low deformation rate range and the strain hardening in the high deformation range. Another object of the present invention is to provide a method for producing the branched propylene-based polymer.

Solution to Problem

As a result of considerable research, the applicant of the present invention found the following. When a branched propylene-based polymer has a propylene-based polymer structure different from the prior art, especially molecular weight distribution and branch distribution, and when the angular frequency ω dependence of the complex viscosity η*(ω) in dynamic viscoelasticity measurement and the MFR satisfy the specific formulae, the components having an extraordinarily long relaxation time decrease. Such a branched propylene-based polymer shows small strain hardening in the low deformation rate range while retaining a necessary melt tension for molding, and it shows a large difference between the strain hardening in the low deformation rate range and the strain hardening in the high deformation rate range.

The branched propylene-based polymer of the present invention has the following properties (1) to (5):

property (1): a melt flow rate (MFR) measured at a temperature of 230° C. and a load of 2.16 kg is 10 g/10 min or more and 100 g/10 min or less;

property (2): a ratio (Mw/Mn) between a weight average molecular weight (Mw) and a number average molecular weight (Mn), both of which are obtained by gel permeation chromatography (GPC), is 2.5 or more and less than 3.5; a ratio (Mz/Mw) between a z average molecular weight (Mz) and a weight average molecular weight (Mw), both of which are obtained by GPC, is 3.0 or more and 4.7 or less; and the z average molecular weight (Mz) is $50.0\times10^4$ or more and $94.0\times10^4$ or less;

property (3): in an integral molecular weight distribution curve obtained by GPC, a percentage ($W100\times10^4$) of a component having a molecular weight of $100\times10^4$ or more, is 1.5 mass % or more and 4.0 mass % or less;

property (4): in a molecular weight distribution curve obtained by 3D-GPC, a branching index g'($100\times10^4$) at an absolute molecular weight $M_{abs}$ of $100\times10^4$ is more than 0.70 and 0.85 or less; and property (5): a ratio [η*(0.01)/η*(100)] between a complex viscosity η*(0.01) at an angular frequency ω of 0.01 rad/s (ω=0.01 rad/s) and a complex viscosity η*(100) at an angular frequency ω of 100 rad/s (ω=100 rad/s) in dynamic viscoelasticity measurement, is 4.0 or more and 20 or less, and η*(0.01)/η*(100) and the MFR satisfy the following formulae (1) and (2):

$$\eta^*(0.01)/\eta^*(100) \leq -21\times\mathrm{Log}(\mathrm{MFR})+45 \quad \text{Formula (1)}$$

$$\eta^*(0.01)/\eta^*(100) \geq -21\times\mathrm{Log}(\mathrm{MFR})+38 \quad \text{Formula (2).}$$

From the viewpoint of relatively decreasing the components having an extraordinarily long relaxation time, the branched propylene-based polymer of the present invention may further have the following property (4'):

property (4'): a weight average molecular weight ($Mw_{abs}$) of the absolute molecular weight obtained by 3D-GPC is less than $100\times10^4$, and in the molecular weight distribution curve obtained by 3D-GPC, a branching index g' ($Mw_{abs}$) at the weight average molecular weight $Mw_{abs}$ of the absolute molecular weight and the branching index g'($100\times10^4$) satisfy the following formula (3):

$$0\leq g'(Mw_{abs})-g'(100\times10^4)\leq0.10 \quad \text{Formula (3).}$$

From the viewpoint of the fluidity and melt strength of a resin during molding, the branched propylene-based polymer of the present invention may further have the following property (6):

property (6): a mesotriad fraction (mm) measured by $^{13}$C-NMR, is 95% or more and less than 99%; a heterologous bond amount (2,1 bond) is 0.05 mol % or more and 0.50 mol % or less; and a heterologous bond amount (1,3 bond) is 0.05 mol % or more and 0.50 mol % or less.

From the viewpoint of the heat resistance, rigidity and texture of a product, the branched propylene-based polymer of the present invention may further have the following property (7):

property (7): in an elution curve obtained by temperature rising elution fractionation (TREF) measurement with o-dichlorobenzene (ODCB), a component eluted at a temperature of 40° C. or less, is 0.1 mass % or more and 3.0 mass % or less.

From the viewpoint of the heat resistance, rigidity and texture of a product, the branched propylene-based polymer of the present invention may further have the following property (8):

property (8): a melting point (Tm) measured by differential scanning calorimetry (DSC) is more than 150.0° C. and less than 160.0° C.

From the viewpoint of keeping a high melt tension during resin molding, the branched propylene-based polymer of the present invention may further have the following property (9):

property (9): a number of long-chain branches measured by $^{13}$C-NMR is 0.1/1000 monomers or more and 0.5/1000 monomers or less.

The branched propylene-based polymer production method of the present invention is a method for producing the branched propylene-based polymer of the present invention, wherein propylene is homopolymerized or copolymerized with a comonomer in the presence of a propylene polymerization catalyst comprising the following components [A-1], [A-2], [B] and [C]:

component [A-1]: a metallocene compound which gives, when the propylene is homopolymerized at 70° C., a propylene homopolymer a-1 having a terminal vinyl rate (Rv) of 0.5 or more, component [A-2]: a metallocene compound which gives, when the propylene is homopolymerized at 70° C., a propylene homopolymer a-2 having a larger weight average molecular weight than the propylene homopolymer a-1 and having a terminal vinyl rate (Rv) of less than 0.5, component [B]: a compound or layered silicate which is reactive with the components [A-1] and [A-2] to form an ion pair, and component [C]: an organoaluminum compound.

In the method for producing the branched propylene-based polymer according to the present invention, the propylene may be homopolymerized or copolymerized with the comonomer by keeping a hydrogen concentration constant, from the viewpoint of preventing too much increase in the components having an extraordinarily long relaxation time, while retaining a necessary melt tension for molding.

Also in the method for producing the branched propylene-based polymer according to the present invention, from the viewpoint of preventing too much increase in the components having an extraordinarily long relaxation time, the propylene may be homopolymerized or copolymerized with the comonomer by keeping the hydrogen concentration constant by continuously introducing hydrogen and the propylene into a polymerization reactor and keeping a ratio between an amount of the introduced hydrogen and that of the introduced propylene constant.

Advantageous Effects of Invention

According to the present invention, the branched propylene-based polymer is obtained, which is configured to show small strain hardening in the low deformation rate range while retaining a necessary melt tension for molding, and which is configured to show a large difference between the strain hardening in the low deformation rate range and the strain hardening in the high deformation rate range. According to the present invention, the method for producing the branched propylene-based polymer is also provided.

BRIEF DESCRIPTION OF THE DRAWINGS

In the accompanying drawings.

DESCRIPTION OF EMBODIMENTS

Figure 1:
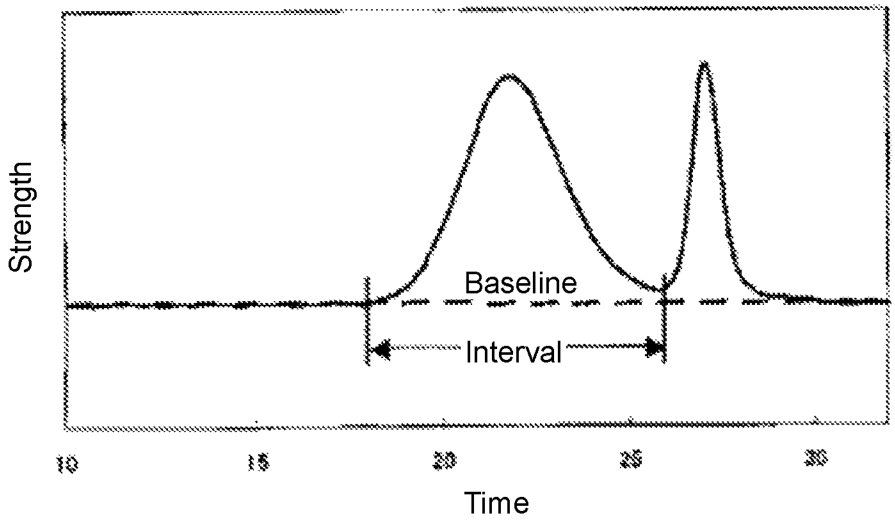
FIG. 1 is a view illustrating the baseline and interval of a chromatogram in GPC.

The branched propylene-based polymer of the present invention has the following properties (1) to (5):

property (1): a melt flow rate (MFR) measured at a temperature of 230° C. and a load of 2.16 kg is 10 g/10 min or more and 100 g/10 min or less;

property (2): a ratio (Mw/Mn) between a weight average molecular weight (Mw) and a number average molecular weight (Mn), both of which are obtained by gel permeation chromatography (GPC), is 2.5 or more and less than 3.5; a ratio (Mz/Mw) between a z average molecular weight (Mz) and a weight average molecular weight (Mw), both of which are obtained by GPC, is 3.0 or more and 4.7 or less; and the z average molecular weight (Mz) is $50.0\times10^4$ or more and $94.0\times10^4$ or less;

property (3): in an integral molecular weight distribution curve obtained by GPC, a percentage ($W100\times10^4$) of a component having a molecular weight of $100\times10^4$ or more, is 1.5 mass % or more and 4.0 mass % or less;

property (4): in a molecular weight distribution curve obtained by 3D-GPC, a branching index g' ($100\times10^4$) at an absolute molecular weight $M_{abs}$ of $100\times10^4$ is more than 0.70 and 0.85 or less; and property (5): a ratio [η*(0.01)/η*(100)] between a complex viscosity η*(0.01) at an angular frequency ω of 0.01 rad/s (ω=0.01 rad/s) and a complex viscosity η*(100) at an angular frequency ω of 100 rad/s (ω=100 rad/s) in dynamic viscoelasticity measurement, is 4.0 or more and 20 or less, and η*(0.01)/η*(100) and the MFR satisfy the following formulae (1) and (2):

$$\eta^*(0.01)/\eta^*(100) \leq -21 \times \mathrm{Log(MFR)} + 45 \quad \text{Formula (1)}$$

$$\eta^*(0.01)/\eta^*(100) \geq -21 \times \mathrm{Log(MFR)} + 38 \quad \text{Formula (2).}$$

The branched propylene-based polymer of the present invention has the properties (1) to (5); it has a branched propylene structure different from the prior art, especially molecular weight distribution and branch distribution; and the angular frequency ω dependence of the complex viscosity η*(ω) in dynamic viscoelasticity measurement and the MFR satisfy the specific formulae, thereby decreasing the components having an extraordinarily long relaxation time. Accordingly, the branched propylene-based polymer of the present invention shows small strain hardening in the low deformation rate range, while retaining a necessary melt tension for molding. As a result, the branched propylene-based polymer of the present invention is a propylene-based polymer configured to show a large difference between the strain hardening in the low deformation rate range and the strain hardening in the high deformation rate range.

Hereinafter, the physical properties of the branched propylene-based polymer of the present invention, the method for producing the branched propylene-based polymer, and so on are explained in detail.

In the present Description, "to" which shows a numerical range is used to describe a range in which the numerical values described before and after "to" indicate the lower limit value and the upper limit value.

The upper and lower limit values of the numerical range may be any combination of values.

The branched propylene-based polymer of the present invention may be a propylene homopolymer, or it may be a copolymer of propylene and C2 to C20 α-olefin other than propylene, such as at least one kind of comonomer selected from ethylene, 1-butene, 1-hexene, 1-octene and 4-methyl-1-pentene.

I. Physical Properties of the Branched Propylene-Based Polymer

Property (1)

For the branched propylene-based polymer of the present invention, the melt flow rate (MFR) measured at a temperature of 230° C. and a load of 2.16 kg is 10 g/10 min or more and 100 g/10 min or less.

The MFR is an index of the fluidity of melted resin. This value decreases as the molecular weight of a polymer increases. On the other hand, this value increases as the molecular weight decreases.

When the MFR of the branched propylene-based polymer is too small, the fluidity of melted resin decreases and makes thermoforming difficult. Accordingly, the MFR is 10 g/10 min or more, preferably more than 13 g/10 min, more preferably 15 g/10 min or more, and still more preferably 20 g/10 min or more. The MFR may be 30 g/10 min or more.

On the other hand, when the MFR is too large, the melt tension decreases. Accordingly, the MFR is 100 g/10 min or less, preferably 90 g/10 min or less, more preferably 80 g/10 min or less, and still more preferably 70 g/10 min or less. The MFR may be 60 g/10 min or less.

In the present invention, the melt flow rate (MFR) is a value measured in accordance with "JIS K7210: Plastics—Determination of the melt mass-flow rate (MFR) and the melt volume-flow rate (MVR) of thermoplastics" and in the following test condition: 230° C. and a load of 2.16 kgf.

The melt flow rate (MFR) can be increased by increasing the polymerization temperature, by decreasing the monomer concentration, or by a general method such as adding hydrogen as a chain transfer agent during polymerization. When the temperature or monomer concentration is fixed, the MFR can be easily adjusted by adjusting the hydrogen amount.

Also, the melt flow rate (MFR) can be increased by appropriately degrading the polymer.

Property (2)

For the branched propylene-based polymer of the present invention, the ratio (Mw/Mn) between the weight average molecular weight (Mw) and the number average molecular weight (Mn), both of which are obtained by gel permeation chromatography (GPC), is 2.5 or more and less than 3.5; the ratio (Mz/Mw) between the z average molecular weight (Mz) and the weight average molecular weight (Mw), both of which are obtained by GPC, is 3.0 or more and 4.7 or less; and the z average molecular weight (Mz) is $50.0 \times 10^4$ or more and $94.0 \times 10^4$ or less.

The above-mentioned Mz, Mw and Mn are indices representing the average molecular weight of a polymer. Mz is the index of the average molecular weight that the high-molecular-weight-side specific gravity increases; Mn is the index of the average molecular weight that the low-molecular-weight-side specific gravity increases; and Mw is the index of the average molecular weight therebetween. The ratios thereof, i.e., Mw/Mn and Mz/Mw, are indices of the extent of the molecular weight distribution of the polymer.

When Mz of the branched propylene-based polymer is too large, the components having an extraordinarily long relaxation time increase. Accordingly, Mz of the branched propylene-based polymer of the present invention is $94.0 \times 10^4$ or less, preferably $90.0 \times 10^4$ or less, more preferably $86.0 \times 10^4$ or less, and still more preferably $80.0 \times 10^4$ or less. Mz may be $70.0 \times 10^4$ or less.

On the other hand, when Mz is small, the melt tension decreases. Accordingly, Mz of the branched propylene-based polymer of the present invention is $50.0 \times 10^4$ or more, preferably $54.0 \times 10^4$ or more, and more preferably $60.0 \times 10^4$ or more.

When Mz/Mw of the branched propylene-based polymer is too large, the components having an extraordinarily long relaxation time increase too much. Accordingly, Mz/Mw of the branched propylene-based polymer of the present invention is 4.7 or less, preferably 4.5 or less, and more preferably 4.3 or less.

On the other hand, when Mz/Mw is too small, the melt tension decreases. Accordingly, Mz/Mw of the branched propylene-based polymer of the present invention is 3.0 or more, preferably 3.3 or more, and more preferably 3.5 or more.

When Mw/Mn of the branched propylene-based polymer is too large, the components having an extraordinarily long relaxation time increase too much. Accordingly, Mw/Mn of the branched propylene-based polymer of the present invention is less than 3.5, preferably 3.4 or less, and more preferably 3.3 or less.

On the other hand, when Mw/Mn is too small, the fluidity of the melted resin decreases during high shearing or high-speed molding. Accordingly, Mw/Mn of the branched propylene-based polymer of the present invention is 2.5 or more, preferably more than 2.8, and more preferably more than 3.0.

From the viewpoint of improving the fluidity of the melted resin while decreasing the viscosity during high shearing or high-speed molding, the number average molecular weight (Mn) of the branched propylene-based polymer of the present invention is preferably $4.0\times10^4$ or more and more preferably $4.5\times10^4$ or more, and it is preferably $6.0\times10^4$ or less, and more preferably $5.5\times10^4$ or less. Mn may be $4.8\times10^4$ or more, or it may be $5.0\times10^4$ or more.

From the viewpoint of the fluidity of the melted resin, the weight average molecular weight (Mw) of the branched propylene-based polymer of the present invention is preferably $14.0\times10^4$ or more, more preferably $15.0\times10^4$ or more, and still more preferably $16.0\times10^4$ or more, and it is preferably $30.0\times10^4$ or less, more preferably $25.0\times10^4$ or less, and still more preferably $23.0\times10^4$ or less. Mw may be $20.0\times10^4$ or less.

When the branched propylene-based polymer of the present invention has the molecular weight and molecular weight distribution property as described above, the components having an extraordinarily long relaxation time decrease. As a result, by the branched propylene-based polymer of the present invention, the fluidity of the melted resin is improved especially during high shearing; the breakage of the melted resin owing to insufficient melt tension is prevented; and the instability phenomenon when the melted resin flows during molding, is suppressed. In addition, in the branched propylene-based polymer of the present invention, the difference between the strain hardening in the low deformation rate range and the strain hardening in the high deformation rate range is likely to be large.

The average molecular weight and molecular weight distribution (Mz, Mw, Mn, Mw/Mn and Mz/Mw) of the branched propylene-based polymer measured by GPC, and the balances thereof can be adjusted as follows by controlling the polymerization conditions such as the catalyst species selection, the polymerization temperature, the monomer concentration and the hydrogen amount.

In the method for producing the branched propylene-based polymer of the present invention, as described later, the polymerization catalyst containing the component [A-1] (a metallocene compound) which produces a macromer and the component [A-2] (a metallocene compound) which copolymerizes a propylene monomer and a macromer, is preferably used. In this case, generally, it is preferable that in the relationship between the components [A-1] and [A-2], the component [A-1] relatively functions as a catalyst component that produces a low-molecular-weight component, and the component [A-2] relatively functions as a catalyst component that produces a high-molecular-weight component. As a result, the rate of change of Mz becomes larger than the rate of change of Mw with respect to the change of the hydrogen amount, and Mz/Mw can be changed without a large change in Mw/Mn, accordingly.

For example, when the hydrogen amount is increased, the rate of change of the decrease in the molecular weight of a polymer produced from the component [A-2] that produces the high-molecular-weight component, is large with respect to a polymer produced from the component [A-1] that produces the low-molecular-weight component. Also, the component [A-1] is relatively more activated than the component [A-2], and the molecular weight distribution changes so that the percentage of the polymer produced from the component [A-1] is larger than the polymer produced from the component [A-2]. Due to this change in the molecular weight distribution, Mz and Mz/Mw can be made smaller without a large change in Mw and Mw/Mn.

On the other hand, when the hydrogen amount is decreased, the rate of change of the increase in the molecular weight of the polymer produced from the component [A-2] that produces the high-molecular-weight component, is large relative to the polymer produced from the component [A-1] that produces the low-molecular-weight component. Due to this change in the molecular weight distribution, Mz and Mz/Mw can be made larger without a large change in Mw and Mw/Mn.

By using the components [A-1] and [A-2], selecting batch polymerization as the polymerization method, and changing the hydrogen concentration with time, from the difference in the change rate with respect to the hydrogen, Mz/Mw and Mz can be made larger without a large change in Mw and Mw/Mn, for example. By selecting continuous polymerization as the polymerization method and keeping the hydrogen concentration constant, Mz/Mw and Mz can be made smaller without a large change in Mw and Mw/Mn.

The above-defined Mz, Mw, Mn, Mw/Mn, Mz/Mw values and the below-described $W100\times10^4$ and W200x10 4 values are obtained by gel permeation chromatography (GPC). The methods and devices used to measure them are as follows.

Device: GPC (ALC/GPC, 150C) manufactured by Waters

Detector: IR detector MIRAN 1A manufactured by FOXBORO (Measurement wavelength: 3.42 μm)

Column: AT-806MS (three sets) manufactured by Showa Denko K. K.

Mobile phase solvent: o-Dichlorobenzene (ODCB)

Measurement temperature: 140° C.

Solvent flow rate: 1.0 mL/min

Sample concentration: 1 mg/mL

Injected sample amount: 0.2 mL

Sample preparation is carried out as follows: a solution (1 mg/mL) is prepared by use of a sample and ODCB (containing 0.5 mg/mL of dibutylhydroxytoluene (BHT)). The sample is dissolved at 140° C. for one hour, thereby preparing the sample.

The baseline and interval of the obtained chromatogram are determined as shown in FIG. 1.

A retention capacity obtained by GPC is converted into a molecular weight by use of a calibration curve created preliminarily with standard polystyrenes. The standard polystyrenes used are the following products manufactured by Tosoh Corporation: F380, F288, F128, F80, F40, F20, F10, F4, F1, A5000, A2500 and A1000.

A calibration curve is created by injecting 0.2 mL of a solution in which the standard polystyrenes are dissolved in ODCB (containing 0.5 mg/mL of BHT) so that they are 0.5 mg/mL each. The calibration curve uses a cubic equation obtained by approximation by the least-squares method.

A viscosity equation used for the conversion into the molecular weight, i.e., $[\eta]=K\times M^{\alpha}$, uses the following numerical values.

PS: $K=1.38\times10^{-4}$, $\alpha=0.7$

PP: $K=1.03\times10^{-4}$, $\alpha=0.78$

Property (3)

For the branched propylene-based polymer of the present invention, in the integral molecular weight distribution curve obtained by GPC, the percentage ($W100\times10^4$) of the component having a molecular weight of $100\times10^4$ or more, is 1.5 mass % or more and 4.0 mass % or less.

Property (3')

For the branched propylene-based polymer of the present invention, in the integral molecular weight distribution curve obtained by GPC, the percentage ($W200\times10^4$) of a component having a molecular weight of $200\times10^4$ is preferably 0.2 mass % or more and 1.5 mass % or less.

Due to the presence of the high-molecular-weight region components, the melt tension of the branched propylene-based polymer of the present invention improves. Accordingly, the present invention focuses on the component having a molecular weight of $100\times10^4$ or more and in the branched propylene-based polymer of the present invention, the percentage ($W100\times10^4$) of the component having a molecular weight of $100\times10^4$ or more, is 1.5 mass % or more, preferably 1.6 mass % or more, and more preferably 1.7 mass % or more, and $W100\times10^4$ may be 1.9 mass % or more, or it may be 2.0 mass % or more.

Due to the presence of the extraordinary-high-molecular-weight region components, the melt tension of the branched propylene-based polymer of the present invention further improves. Accordingly, the present invention focuses attention on the component having a molecular weight of $200\times10^4$, and in the branched propylene-based polymer of the present invention, the percentage ($W200\times10^4$) of the component having a molecular weight of $200\times10^4$ is preferably 0.2 mass % or more, more preferably 0.25 mass % or more, and still more preferably 0.3 mass % or more.

On the other hand, when the amount of the high-molecular-weight region components is too large, the components having an extraordinarily long relaxation time increase too much, and in the elongational viscosity measurement, the difference between the strain hardening index at a strain rate of 10/sec (i.e., SHI@10) and the strain hardening index at a strain rate of 1.0/sec (i.e., SHI@1) becomes small. Accordingly, $W100\times10^4$ of the branched propylene-based polymer of the present invention is 4.0 mass % or less, preferably 3.8 mass % or less, more preferably 3.5 mass % or less, and still more preferably 2.5 mass % or less.

For the same reason, $W200\times10^4$ is preferably 1.5 mass % or less, more preferably 1.2 mass % or less, and still more preferably 1.1 mass % or less.

Figure 2:
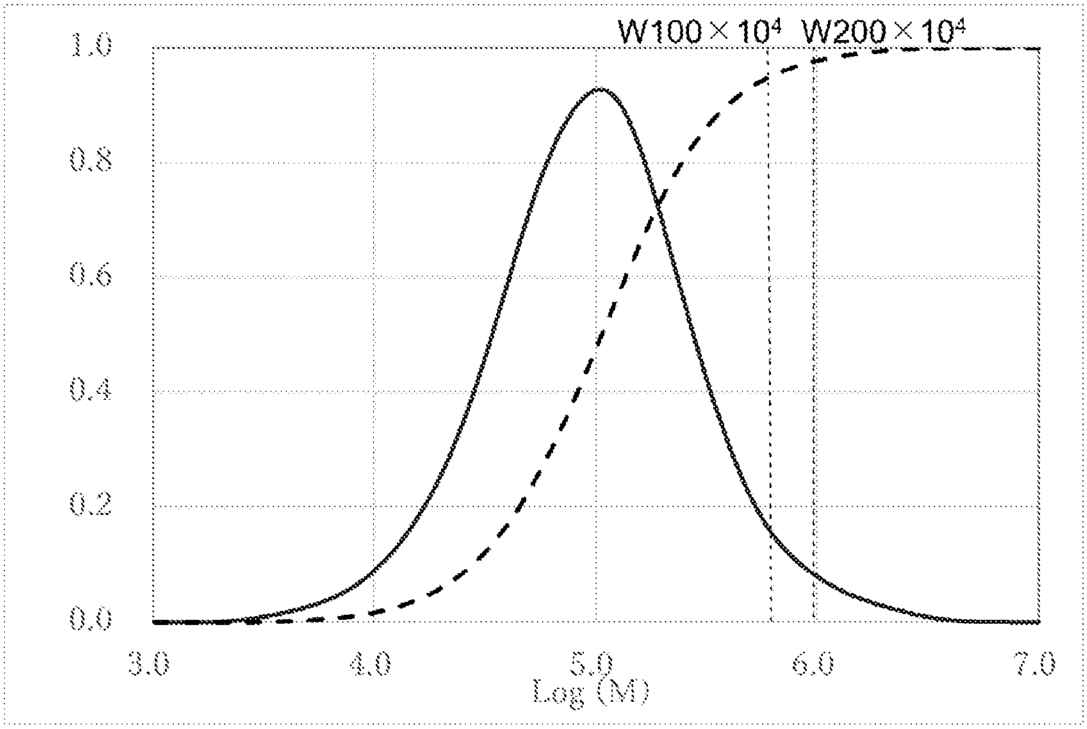
FIG. 2 is a view showing an example of an integral molecular weight distribution curve.

In the present invention, $W100\times10^4$ is defined as a value obtained by, in the integral molecular weight distribution curve (the whole amount is normalized to 1) obtained by GPC, subtracting the integral value until the molecular weight (M) of $100\times10^4$ (Log(M)=6.0) from 1 and multiplying the value thus obtained by 100. $W200\times10^4$ is defined as a value obtained by, in the integral molecular weight distribution curve (the whole amount is normalized to 1) obtained by GPC, subtracting the integral value until the molecular weight (M) of $200\times10^4$ (Log(M)=6.3) from 1 and multiplying the value thus obtained by 100. FIG. 2 shows an example of the integral molecular weight distribution curve.

In the present invention, as with the above-described property (2), $W100\times10^4$ and $W200\times10^4$ of the branched propylene-based polymer can be adjusted by controlling the polymerization conditions such as the catalyst species selection, the polymerization temperature, the monomer concentration and the hydrogen amount.

Property (4)

For the branched propylene-based polymer of the present invention, in the molecular weight distribution curve obtained by 3D-GPC, the branching index g' ($100\times10^4$) at an absolute molecular weight $M_{abs}$ of $100\times10^4$ is more than 0.70 and 0.85 or less.

The branching index g' is given by the ratio ($[\eta]_{br}/[\eta]_{lin}$) of the intrinsic viscosity $[\eta]b_r$ of the polymer having a long-chain branched structure to the intrinsic viscosity $[\eta]_{lin}$ of a linear polymer having the same molecular weight. When the long-chain branched structure exists in the polymer molecule, the radius of gyration decreases compared to the linear polymer molecule having the same molecular weight. As the radius of gyration decreases, the intrinsic viscosity also decreases. Accordingly, the branching index g' is a value less than 1.0. The branching index g' of the linear polymer is defined as 1.0.

The definition of the branching index g' is described in, for example, "Developments in Polymer Characterization-4" (J. V. Dawkins ed. Applied Science Publishers, 1984), and the branching index g' is an index heretofore known to those skilled in the art.

The branching index g' can be obtained as the function of an absolute molecular weight $M_{abs}$ by use of a 3D-GPC.

In the present invention, the 3D-GPC is a GPC device to which three detectors are connected. The three sensors are a refractive index detector (RI), a viscometer, and a multi-angle laser light scattering detector (MALLS).

Since the absolute molecular weight ($M_{abs}$) measured by use of the MALLS has branched structures in the high-molecular-weight region of 100×10 4, the melt strength of the branched propylene-based polymer of the present invention is improved. Accordingly, the branching index g' ($100\times10^4$) at an absolute molecular weight $M_{abs}$ of $100\times10^4$ ($M_{abs}=100\times10^4$) is 0.85 or less, preferably 0.80 or less, and more preferably 0.79 or less. On the other hand, when there are too many branched structures in the high-molecular-weight region where the absolute molecular weight ($M_{abs}$) is $100\times10^4$, the components having an extraordinarily long relaxation time increase too much. Accordingly, the lower limit value of the branching index g' ($100\times10^4$) is more than 0.70, preferably 0.72 or more, and more preferably 0.74 or more.

Since the amount of the component having a branch in the moiety where the absolute molecular weight is $100\times10^4$ ($M_{abs}=100\times10^4$), which corresponds to the high-molecular-weight region, is large, the melt strength of the branched propylene-based polymer of the present invention improves, and as a non-linear viscoelastic property, the strain hardening index (SHI) becomes large in the elongational viscosity measurement. On the other hand, even when the number of the branches in the whole polymer is large, the strain hardening index (SHI) does not become large as long as the amount of the component having a branch in the moiety where the absolute molecular weight is $100\times10^4$ ($M_{abs}=100\times10^4$), which corresponds to the high-molecular-weight region, is not large.

For the branched propylene-based polymer of the present invention, the weight average molecular weight ($Mw_{abs}$) of the absolute molecular weight obtained by 3D-GPC is preferably less than $100\times10^4$. From the viewpoint of obtaining strong melt strength, the branched propylene-based polymer of the present invention preferably has branched structures from the weight average molecular weight ($Mw_{abs}$) region of the absolute molecular weight ($M_{abs}$) to the high-molecular-weight region where the absolute molecular weight ($Mw_{abs}$) is $100\times10^4$.

Accordingly, the branching index g' ($Mw_{abs}$) at the weight average molecular weight $Mw_{abs}$ of the absolute molecular weight is preferably 0.90 or less, more preferably 0.85 or less, and still more preferably 0.84 or less. On the other hand, the upper limit value thereof is preferably 0.75 or more, more preferably 0.76 or more, and still more preferably 0.77 or more. The lower limit value may be 0.80 or more.

The strain hardening index (SHI) correlates with relaxation time distribution and has a dependence on the strain rate. That is, when there are many components having an extraordinarily long relaxation time as the branched components, compared to the case where there are less components having an extraordinarily long relaxation time as the branched components, the branched propylene-based polymer of the present invention shows a large strain hardening property from a high strain rate to a low strain rate, even if the branched propylene-based polymer has the same melt strength in both cases. On the other hand, when there are less components having an extraordinarily long relaxation time as the branched components, the branched propylene-based polymer shows a large strain hardening index at a high strain rate; however, it shows small strain hardening index at a low strain rate.

Due to having the branched structures, the relaxation time of the branched components is sufficiently long compared to linear molecules, and the relaxation time becomes longer as the molecular weight increases. That is, when the molecular weight increases too much, the branched components become components having an extraordinarily long relaxation time.

That is, when the branched propylene-based polymer of the present invention has the relationship of $Mw_{abs}<100\times10^4$, the relaxation time of the branched component that $M_{abs}$, which is larger in molecular weight, is present at $100\times10^4$, is longer than the branched component that $M_{abs}$ is present at $Mw_{abs}$, and it is a component having an extraordinarily long relaxation time.

Accordingly, the branched propylene-based polymer preferably has the following property (4f), from the point of view that while the branched propylene-based polymer has the components having an extraordinarily long relaxation time, the relaxation time is not lengthened more extraordinarily.

Property (4')

For the branched propylene-based polymer of the present invention, the weight average molecular weight ($Mw_{abs}$) of the absolute molecular weight obtained by 3D-GPC is preferably less than $100\times10^4$, and in the molecular weight distribution curve obtained by 3D-GPC, the branching index g' ($Mw_{abs}$) at the weight average molecular weight $Mw_{abs}$ of the absolute molecular weight and the branching index g' ($100\times10^4$) satisfy the following formula (3):

$$0\leq g'(Mw_{abs})-g'(100\times10^4)\leq 0.10 \quad \text{Formula (3).}$$

The branched propylene-based polymer of the present invention preferably satisfies the formula (3) since the branched propylene-based polymer obtains the following effects. When the formula (3) is satisfied, the difference between the branching index g' ($Mw_{abs}$) and the branching index g' ($100\times10^4$) becomes small, and the components having an extraordinarily long relaxation time relatively decrease. Accordingly, the branched propylene-based polymer of the present invention can be easily relaxed when the strain rate is slow, compared to a branched propylene-based polymer having the same melt strength, and the difference between SHI@10 and SHI@1 becomes large.

The branched propylene-based polymer of the present invention preferably has the branch distribution in this range, since it can maintain the balance between the melt strength (especially the elongational viscosity) of the whole branched propylene-based polymer and the fluidity of the melted resin.

The details of the method for measuring the molecular weight distribution and the branching index of each molecular weight by the absolute molecular weight $M_{abs}$, is as follows.

As a GPC device equipped with a refractive index detector (RI) and a viscometer, ALLIANCE GPCV2000 (manufactured by Waters Corporation) is used. As a multi-angle laser light scattering detector (MALLS), DAWN-E (manufactured by Wyatt Technology) is used.

The detectors are connected in the order of the MALLS, the RI and the viscometer.

As a mobile phase solvent, 1,2,4-trichlorobenzene is used, to which antioxidant IRGANOX 1076 (manufactured by BASF Japan) is added at a concentration of 0.5 mg/mL.

The flow rate is set to 1 mL/min. Two GMHHR-H(S) HT columns (manufactured by Tosoh Corporation) are connected in series and used.

The temperature of the columns, the temperature of a sample injector and the temperature of the detectors are 140° C.

The concentration of the sample is set to 1 mg/mL, and the injection volume (the volume of a sample loop) is 0.2175 mL.

To obtain the absolute molecular weight ($M_{abs}$) and root-mean-square radius of gyration (Rg) obtained from the MALLS and the intrinsic viscosity ([η]) obtained from the viscometer, calculation is carried out by reference to the following references, using ASTRA version 4.73.04 (data processing software included in the MALLS).

REFERENCES

1. Developments in Polymer Characterization, Vol. 4. Essex: Applied Science; 1984. Chapter 1.
2. Polymer, 45, 6495-6505 (2004)
3. Macromolecules, 33, 2424-2436 (2000)
4. Macromolecules, 33, 6945-6952 (2000)

The branching index g' is calculated as the ratio ($[\eta]_{br}/[\eta]_{lin}$) of the intrinsic viscosity ($[[\eta]_{br}$) obtained by measuring the sample by the viscometer to the intrinsic viscosity ($[\eta]_{lin}$) separately obtained by measuring the linear polymer.

As the linear polymer, a commercially-available homopolypropylene (NOVATEC-PP (registered trademark) manufactured by Japan Polypropylene Corporation, grade FY6) is used to obtain $[\eta]_{lin}$. The fact that the log of the linear polymer $[\eta]_{lin}$ has a linear relationship with the log of the molecular weight, is known as the Mark-Houwink-Sakurada equation. Accordingly, the value of $[\eta]_{lin}$ can be obtained by appropriate extrapolation into the low-molecular-weight side or the high-molecular-weight side.

In the present invention, as with the above-described property (2), g'($100\times10^4$), g'($Mw_{abs}$) and g'($Mw_{abs}$)−g'($100\times10^4$) of the branched propylene-based polymer can be adjusted by controlling the polymerization conditions such as the catalyst species selection, the polymerization temperature, the monomer concentration and the hydrogen amount.

Property (5)

The ratio [η*(0.01)/η*(100)] between the complex viscosity η*(0.01) at an angular frequency ω of 0.01 rad/s (ω=0.01 rad/s) and the complex viscosity η*(100) at an angular frequency ω of 100 rad/s (ω=100 rad/s) in dynamic viscoelasticity measurement, is 4.0 or more and 20 or less, and η*(0.01)/η*(100) and the MFR satisfy the following formulae (1) and (2):

$$\eta^*(0.01)/\eta^*(100)\leq -21\times \mathrm{Log}(MFR)+45 \quad \text{Formula (1)}$$

$$\eta^*(0.01)/\eta^*(100)\geq -21\times \mathrm{Log}(MFR)+38 \quad \text{Formula (2).}$$

For the non-Newtonian properties of a polymer melt, in general, due to the presence of components having a long relaxation time, the storage modulus on the low frequency side increases, and the loss modulus also increases. The complex viscosity η* is represented by the following formula using the storage modulus G' and the loss modulus G". As the storage modulus and the loss modulus increase, the complex viscosity also increases.

$$\eta^*(\omega) = \frac{\sqrt{G'(\omega)^2 + G''(\omega)^2}}{\omega}$$

The above-described η*(100), which is a complex viscosity at ω=100 rad/s in dynamic viscoelasticity measurement, is a viscosity under high shearing and correlates with the fluidity of the melted resin in molding accompanied by fast deformation. To make the strain hardening in the high deformation rate range large, the η*(100) of the branched propylene-based polymer of the present invention is preferably 100 Pa·s or more, and more preferably 120 Pa·s or more; moreover, it is preferably 350 Pa·s or less, and more preferably 300 Pa·s or less. The η*(100) may be 150 Pa·s or more, or it may be 180 Pa·s or more; moreover, it may be 250 Pa·s or less.

The above-described η*(0.01), which is a complex viscosity at ω=0.01 rad/s in dynamic viscoelasticity measurement, is a viscosity under low shearing, and it correlates with the fluidity of the melted resin in molding accompanied by slow deformation. To make the strain hardening in the low deformation rate range small, the η*(0.01) of the branched propylene-based polymer of the present invention is preferably 500 Pa·s or more, and more preferably 1000 Pa·s or more; moreover, it is preferably 4000 Pas or less, and more preferably 3000 Pa·s or less. The η*(0.01) may be 2500 Pa·s or less.

To make a large difference between the strain hardening in the low deformation rate range and the strain hardening in the high deformation rate range, the η*(0.01)/η*(100) of the branched propylene-based polymer of the present invention is 4.0 or more and 20.0 or less, preferably 4.5 or more, and more preferably 5.0 or more; moreover, it is preferably 15.0 or less, and more preferably 9.0 or less.

To make a small difference between the strain hardening in the low deformation rate range and the strain hardening in the high deformation rate range, the η*(0.01)/η*(100) of the branched propylene-based polymer of the present invention is 4.0 or more and 20.0 or less, preferably 4.5 or more, and more preferably 5.0 or more; moreover, it is preferably 15.0 or less, and more preferably 9.0 or less.

Satisfying the formulae (1) and (2) means that the ratio between the low frequency-side and high frequency-side complex viscosities of the branched propylene-based polymer of the present invention, that is, the ratio η*(0.01)/η*(100) is in the ranges of the specific relations, with respect to the MFR.

The complex viscosity ratio η*(0.01)/η*(100) of the branched propylene-based polymer of the present invention is in the ranges different from conventional propylene-based polymers relative to the MFR. That is, the ratio specifies the formulae (1) and (2).

When the complex viscosity ratio η*(0.01)/η*(100) is too large relative to the MFR, there are many components having an extraordinarily long relaxation time, and the instability phenomenon of the flowing melted resin is caused. More specifically, in extrusion lamination molding, for example, draw resonance increases during high-speed molding. Accordingly, the branched propylene-based polymer of the present invention satisfies the following formula (1):

$$\eta^*(0.01)/\eta^*(100) \leq -21\times\text{Log(MFR)}+45 \qquad \text{Formula (1).}$$

The branched propylene-based polymer of the present invention more preferably satisfies the following formula (1'):

$$\eta^*(0.01)/\eta^*(100) \leq -21\times\text{Log(MFR)}+43 \qquad \text{Formula (1').}$$

On the other hand, when the complex viscosity ratio η*(0.01)/η*(100) is too small relative to the MFR, the melt tension is insufficient. More specifically, in extrusion lamination molding, for example, a large neck-in phenomenon occurs during high-speed molding. Accordingly, the branched propylene-based polymer of the present invention satisfies the following formula (2):

$$\eta^*(0.01)/\eta^*(100) \geq -21\times\text{Log(MFR)}+38 \qquad \text{Formula (2).}$$

The branched propylene-based polymer of the present invention more preferably satisfies the following formula (2'):

$$\eta^*(0.01)/\eta^*(100) \geq -21\times\text{Log(MFR)}+40 \qquad \text{Formula (2').}$$

In general, there is a problem in that as the fluidity of the melted resin improves, the melt strength deteriorates. Accordingly, there is a demand for a propylene-based polymer having both necessary fluidity and excellent melt strength. The branched propylene-based polymer satisfying the formulae (1) and (2) while having excellent melt strength, is a polymer that could not be achieved with conventional branched propylene-based polymers, and it can be said to be a polymer having a high degree of balance between the fluidity of the melted resin and the melt strength. Considering that the complex viscosity ratio η*(0.01)/η*(100) is a function negatively correlated with an increase in the MFR, and based on the data of Examples and the data of Comparative Examples 1, 2 and 3 satisfying the same level of branching index g'($100\times10^4$) as Examples and having high melt tension, the relational formulae between the complex viscosity ratio and the MFR, which distinguish between Examples that can solve the problems and Comparative Examples of the prior art that cannot solve the problems, were determined approximately. (see FIG. 3).

When the η*(0.01), the η*(100) and the η*(0.01)/η*(100) fall within the ranges specified above, the instability phenomenon of when the melted resin flows during molding, is easily suppressed; the fluidity of the melted resin is improved especially during high shearing; and the breakage of the melted resin owing to insufficient melt tension is easily prevented. Also, the difference between the strain hardening in the low deformation rate range and the strain hardening in the high deformation rate range is likely to be large.

The complex viscosity (η*) by the dynamic viscoelasticity measurement of the branched propylene-based polymer of the present invention, can be measured by a common dynamic viscoelasticity measuring device. As the dynamic viscoelasticity measuring device, examples include, but are not limited to, ARES-G2 (product name, manufactured by TA Instruments).

While preventing air bubbles from entering, compression molding of the propylene-based polymer is conducted by pressing at 180° C. for 5 minutes, thereby obtaining a disk-shaped measurement sample having a thickness of 2.0 mm and a diameter of 25 mm. The measurement of the sample is performed after compressing the measurement sample of 2.0 mm in thickness to 1.5 mm in thickness using parallel circular plates with a diameter of 25 mm kept at 180° C. The storage modulus (G') and loss modulus (G") of the measurement sample are measured in the following conditions using the parallel circular plates (diameter 25 mm) arranged with a gap of 1.5 mm.

Temperature: 180° C.

Strain amount: 0.1% to 40%

Frequency range: 0.01 rad/sec to 100 rad/sec

Measurement points: 5 Points per digit of ω

As with the above-described property (2), the property (5) can be adjusted and satisfied by controlling the polymerization conditions such as the catalyst species selection, the polymerization temperature, the monomer concentration and the hydrogen amount.

Property (6)

For the branched propylene-based polymer of the present invention, the mesotriad fraction (mm) measured by $^{13}C$-NMR, is preferably 95% or more and less than 99%; the heterologous bond amount (2,1 bond) is preferably 0.05 mol % or more and 0.50 mol % or less; and the heterologous bond amount (1,3 bond) is preferably 0.05 mol % or more and 0.50 mol % or less.

The crystallinity of the branched propylene-based polymer is susceptible to the stereoregularity that is expressed as a mesotriad fraction (mm) or mesopentad fraction (mmmm) and the regioregularity that is expressed as a heterologous bond (2,1 bond) or a heterologous bond (1,3 bond). That is, the crystallization is developed by folding back a lamella at a regularity absent part (such as a stereoirregular bond part and a heterologous bond part).

When the stereoregularity and regioregularity of the branched propylene-based polymer of the present invention are in the above-described ranges, it is considered that the crystallization process resulting from shear or elongational deformation field improves the fluidity and melt strength of the resin during gradual cooling and solidification during molding.

Accordingly, the mesotriad fraction (mm) of the branched propylene-based polymer of the present invention measured by $^{13}C$-NMR, is preferably 95% or more, more preferably 96% or more, and still more preferably 97% or more, from the viewpoint of improving the melt strength during the solidification.

From the viewpoint of improving the melt strength during the solidification, the heterologous bond amount (2,1 bond) of the branched propylene-based polymer of the present invention is preferably 0.05 mol % or more and 0.50 mol % or less, more preferably 0.10 mol % or more and 0.40 mol % or less, and still more preferably 0.20 mol % or more and 0.30 mol % or less.

From the viewpoint of improving the melt strength during the solidification, the heterologous bond amount (1,3 bond) of the branched propylene-based polymer of the present invention is preferably 0.05 mol % or more and 0.50 mol % or less, more preferably 0.10 mol % or more and 0.40 mol % or less, and still more preferably 0.20 mol % or more and 0.30 mol % or less.

For the branched propylene-based polymer of the present invention, the method for measuring and calculating the mesotriad fraction (mm) measured by $^{13}C$-NMR, the heterologous bond amount (2,1 bond) and the heterologous bond amount (1,3 bond) are as follows.

Sample Preparation and Measurement Condition

First, 200 mg of a sample, 2.4 mL of a solvent (o-dichlorobenzene/deuterated benzene bromide ($C_6D_5Br$) in a volume ratio of 2/1) and hexamethyldisiloxane, which is a chemical shift standard, are put in an NMR sample tube (inner diameter 10 mm) and uniformly dissolved by a block heater at 150° C.

($^1H$-NMR)

Device: AV400 (product name, an NMR device manufactured by Bruker BioSpin K.K.)

Probe: Cryoprobe (diameter 10 mm)

Sample temperature: 120° C.

Pulse angle: 4.5°

Pulse interval: 2 Seconds

Accumulation times: 1024

Chemical shift: The chemical shift of the proton signal of hexamethyldisiloxane is set to 0.09 ppm, and this is used as a chemical shift standard for the chemical shift of the signal of another proton.

($^{13}C$-NMR)

Device: AV400 (product name, an NMR device manufactured by Bruker BioSpin K.K.)

Probe: Cryoprobe (diameter 10 mm)

Sample temperature: 120° C.

Pulse angle: 45°

Pulse interval: 17.2 Seconds

Accumulation times: 3072

Decoupling condition: Broadband decoupling method

Chemical shift: The chemical shift of the $^{13}C$ signal of hexamethyldisiloxane is set to 1.98 ppm, and this is used as a chemical shift standard for the chemical shift of the signal of another $^{13}C$.

[Stereoregularity Calculation Method: The Mesotriad Fraction (Mm) and the Mesopentad Fraction (Mmmm)]

The mesotriad fraction (mm) of propylene unit triad sequences and the mesopentad fraction (mmmm) of propylene unit pentad sequences are obtained by substituting the integrated intensity of a $^{13}C$ signal measured by $^{13}C$-NMR into the following formulae (4) and (4'), respectively:

$$mm(\%)=I_{mm}\times100/(I_{mm}+3\times I_{mrrm}) \quad \text{Formula (4)}$$

$$mmmm(\%)=(I_{mm}-2\times I_{mrrm})\times100/(I_{mm}+3\times I_{mrrm}) \quad \text{Formula (4')}$$

In the formulae, $I_{mm}$ is the integrated intensity of the $^{13}C$ signal that the propylene unit triad sequences are assigned to the bonding type of the mm, and it is calculated as the integrated intensity of the signal that the chemical shift ranges from 23.6 ppm to 21.1 ppm (hereinafter, it will be expressed as "123.6-21.1").

In the same manner as above, the integrated intensity of the signal that the chemical shift ranges from X ppm to Y ppm, will be expressed as "$I_{X-Y}$".

$I_{mrrm}$ is the integrated intensity of the $^{13}C$ signal that the propylene unit pentad sequences are assigned to the bonding type of the mrrm, and it is a value expressed as "$I_{19.9-19.7}$".

Spectrum assignment can be carried out with reference to the following:

"Polymer Journal", volume 16, p. 717 (1984), Asakura Shoten Publishing Co., Ltd., "Macromolecules", volume 8, p. 687 (1975), and "Polymer", volume 30, p. 1350 (1989).

The chemical shift range is slightly shifted by the molecular weight of a polymer or the like. However, the region can be easily identified.

[Regioregularity Calculation Method: The Heterologous Bond Amount (2,1 Bond) and the Heterologous Bond Amount (1,3 Bond)]

In addition to a structure based on a regular 1,2-propylene insertion (i.e., 1,2 bond), the branched propylene-based polymer of the present invention may have 2,1 and 1,3 bonds which are based on irregular propylene insertions (a 2,1-propylene insertion and a 1,3-propylene insertion).

The heterologous bond amount (2,1 bond) (mol concentration) and the heterologous bond amount (1,3 bond) (mol concentration) are obtained by the following formulae, using the integrated intensity of the $^{13}$C signal measured by $^{13}$C-NMR.

$$\text{heterologous bond amount (2,1 bond) (mol \%)} = I_{2,1\text{-}P} \times 100/(I_{1,2\text{-}P} + I_{2,1\text{-}P} + I_{1,3\text{-}P})$$

$$\text{heterologous bond amount (1,3 bond) (mol \%)} = I_{1,3\text{-}P} \times 100/(I_{1,2\text{-}P} + I_{2,1\text{-}P} + I_{1,3\text{-}P})$$

In the formulae, $I_{1,2\text{-}P}$, $I_{2,1\text{-}P}$ and $I_{1,3\text{-}P}$ are the integrated intensity of the $^{13}$C signal that the propylene unit is assigned to the bonding type of the 1,2 bond, the integrated intensity of the $^{13}$C signal that the propylene unit is assigned to the bonding type of the 2,1 bond, and the integrated intensity of the $^{13}$C signal that the propylene unit is assigned to the bonding type of the 1,3 bond, respectively. They are obtained as follows:

$$I_{1,2\text{-}P} = I_{48.80\text{-}44.50}$$

$$I_{2,1\text{-}P} = (I_{34.68\text{-}34.63} + I_{35.47\text{-}35.40} + I_{35.94\text{-}35.70})/2$$

$$I_{1,3\text{-}P} = I_{37.50\text{-}37.20}/2.$$

As with the above-described property (2), the property (6) can be adjusted and satisfied by controlling the polymerization conditions such as the catalyst species selection, the polymerization temperature, the monomer concentration and the hydrogen amount.

Property (7)

For the branched propylene-based polymer of the present invention, in the elution curve obtained by temperature rising elution fractionation (TREF) measurement with o-dichlorobenzene (ODCB), the amount of the component eluted at a temperature of 40° C. or less, is preferably 0.1 mass % or more and 3.0 mass % or less.

The component eluted at 40° C. or less is a low-crystalline component. When the amount of this component is large, the branched propylene-based polymer may have reduced crystallinity, resulting in reduced heat resistance and rigidity as a product. In the branched propylene-based polymer of the present invention, accordingly, the amount of the component eluted at a temperature of 40° C. or less is preferably 3.0 mass % or less, more preferably 2.0 mass % or less, still more preferably 1.0 mass % or less, and particularly preferably 0.7 mass % or less.

On the other hand, when the amount of the component eluted at 40° C. or less is too small, for example, in laminate molding, excessively high rigidity and, as a result, poor texture (e.g., unpleasant touch) may be obtained. In the branched propylene-based polymer of the present invention, accordingly, the amount of the component eluted at a temperature of 40° C. or less is preferably 0.1 mass % or more, more preferably 0.2 mass % or more, still more preferably 0.3 mass % or more, and particularly preferably 0.4 mass % or more.

In general, the amount of the component which is soluble at 40° C. or less from the branched propylene-based polymer in the temperature rising elution fractionation (TREF) using o-dichlorobenzene (ODCB), can be kept low by use of the metallocene compound as a catalyst component for polymerization. Also, it is preferable that the amount of an isomer incorporated in the metallocene compound is kept low; in the catalyst production, the metallocene compound is brought into mild contact with the organoaluminum compound; and the temperature condition of the polymerization reaction is not extremely high.

The details of the method for measuring the component eluted by temperature rising elution fractionation (TREF), are as follows.

First, a sample is dissolved at 140° C. in ODCB to obtain a solution. The solution is introduced into a TREF column at 140° C. The column is cooled down to 100° C. at a temperature decrease rate of 8° C./min; the column is further cooled down to 40° C. at a temperature decrease rate of 4° C./min; and then the column is kept at 40° C. for 10 minutes. Then, a solvent (ODCB) is discharged into the column at a flow rate of 1 mL/min for 10 minutes, while keeping the column at 40° C.; moreover, the solvent is discharged into the column at the same flow rate for 60 minutes, while increasing the column temperature linearly from 40° C. to 140° C. at a temperature increase rate of 100° C./60 min, thereby eluting the sample to obtain an elution curve.

The ratio of the elution amount of the component eluted at a temperature of 40° C. to the whole elution amount, is obtained as the amount (mass %) of the component eluted at a temperature of 40° C. or less.

Column size: 4.3 mm (Diameter)×150 mm
Column filler: 100 μm Surface-deactivated glass beads
Solvent: o-Dichlorobenzene (ODCB)
Sample concentration: 5 mg/mL
Injected sample amount: 0.1 mL
Solvent flow rate: 1 mL/min
Detector: MIRAN-1A IR detector manufactured by FOXBORO (measurement wavelength: 3.42 μm)

Property (8)

For the branched propylene-based polymer of the present invention, the melting point (Tm) measured by differential scanning calorimetry (DSC) is preferably more than 150.0° C. and less than 160.0° C.

It is considered that the branched propylene-based polymer of the present invention does not decrease the melt tension when the melting point (Tm) in this range. Accordingly, the Tm of the branched propylene-based polymer of the present invention is preferably more than 150.0° C., more preferably 152.0° C. or more, and still more preferably 154.0° C. or more. On the other hand, it is preferably less than 160.0° C., more preferably 158.0° C. or less, and still more preferably 157.0° C. or less.

The Tm of the branched propylene-based polymer of the present invention can be adjusted by selecting a metallocene compound with less failures arising from regioregularity as the polymerization catalyst, selecting the combination of several metallocene compounds, and controlling the polymerization temperature, the pressure condition and the thickness of crystals.

In the present invention, the melting point (Tm) can be obtained as follows. Using a DSC (DSC6200) manufactured by Seiko Instruments, Inc., a sheet-shaped sample (5 mg) was put in an aluminum pan; the temperature of the sample was increased from room temperature to 200° C. at a temperature increase rate of 100° C./min; the sample is kept at the temperature for 5 minutes; the sample temperature is decreased to 40° C. at a temperature decrease rate of 10° C./min for crystallization; the crystallization maximum peak temperature (° C.) at the time of the crystallization is obtained as a crystallization temperature (Tc); and the sample temperature is increased to 200° C. at a temperature increase rate of 10° C./min to melt the sample, and the melting maximum peak temperature (° C.) at the time of the melting is obtained as the melting point (Tm).

The sheet-shaped sample can be obtained as follows. The branched propylene-based polymer, which is in a powder form in this step, is sandwiched between pressing plates. The sandwiched branched propylene-based polymer powder is pre-heated at 190° C. for two minutes, pressed at 5 MPa for two minutes, and then cooled down at 0° C. and 10 MPa for two minutes, thereby obtaining the sheet-shaped sample.

Property (9)

From the point of view that the branched propylene-based polymer of the present invention keeps the melt tension high during molding, the number of long-chain branches measured by $^{13}$C-NMR is preferably 0.1/1000 monomers or more and 0.5/1000 monomers or less. From the point of view that the components having an extraordinarily long relaxation time are not increased too much, the number of the long-chain branches of the branched propylene-based polymer of the present invention may be 0.3/1000 monomers or less.

[Method for Calculating the Number of the Long-Chain Branches (the LCB Number)]

The number of the long-chain branches (the LCB number) is the number per 1000 propylene monomer units calculated by the following formula using, when the methylene carbon intensity of the propylene main chain of 49.00 ppm to 44.33 ppm is normalized to 1000 by $^{13}$C-NMR, the signal integrated intensities of the carbon (methine carbon) of the branch point of 31.72 ppm to 31.66 ppm and the three methylene carbons bound to the carbons (methine carbons) of the branch points of 44.09 ppm to 44.03 ppm, 44.78 ppm to 44.72 ppm, and 44.90 ppm to 44.84 ppm.

$$\text{Number of the long-chain branches (the LCB number)}=[(I_{44.09\text{-}44.03}+I_{44.78\text{-}44.72}+I_{44.90\text{-}44.84}+]I_{31.72\text{-}31.66})/4]/I_{49.00\text{-}44.33}$$

As with the above-described property (2), the property (9) can be adjusted and satisfied by controlling the polymerization conditions such as the catalyst species selection, the polymerization temperature, the monomer concentration and the hydrogen amount.

By satisfying the properties (1) to (5), the branched propylene-based polymer of the present invention can decrease the components having an extraordinarily long relaxation time and can increase the difference resulting from the strain rate of the strain hardening index, while keeping the melt tension high. The branched propylene-based polymer of the present invention preferably has the following properties (10) and (11), since it can increase the difference resulting from the strain rate of the strain hardening index, while keeping the melt tension high. In addition, the branched propylene-based polymer of the present invention preferably satisfies any one of the properties (6) to (9), since the performances resulting from the above-described properties are improved.

Property (10)

In the measurement of the elongational viscosity of the branched propylene-based polymer of the present invention, the lower limit of the strain hardening index (SHI@10) at a high strain rate (10/sec) is preferably 1.00 or more, more preferably 1.10 or more, still more preferably 1.20 or more. On the other hand, the upper limit of the strain hardening index (SHI@10) is preferably 1.70 or less, more preferably 1.60 or less, and still more preferably 1.50 or less. The upper limit of the strain hardening index (SHI@10) may be 1.40 or less, or it may be 1.30 or less.

In the measurement of the elongational viscosity of the branched propylene-based polymer of the present invention, the upper limit of the strain hardening index (SHI@1) at a low strain rate (1.0/sec) is preferably 1.20 or less, more preferably 1.10 or less, and still more preferably 1.05 or less. On the other hand, the lower limit of the strain hardening index (SHI@1) is preferably 0.70 or more, more preferably 0.80 or more, and still more preferably 0.90 or more.

The branched propylene-based polymer of the present invention can increase the difference resulting from the strain rate of the strain hardening index. The strain hardening indices SHI@10 and SHI@1 can fall within the above ranges; moreover, the difference between them (SHI@10-SHI@1) can be preferably 0.10 or more and 0.25 or less. The difference (SHI@10-SHI@1) may be more preferably 0.12 or more, and it may be still more preferably 0.15 or more and 0.20 or less.

When there are many components having an extraordinarily long relaxation time in the branched propylene-based polymer, both the strain hardening index SHI@10 at a high strain rate and the strain hardening index SHI@1 at a low strain rate become large; therefore, the difference between the strain hardening indices SHI@10 and SHI@1 become small. On the other hand, when there are less components having an extraordinarily long relaxation time in the branched propylene-based polymer, while the strain hardening index SHI@10 is a large value, the strain hardening index SHI@1 is not large, and the difference between the strain hardening indices SHI@10 and SHI@1 becomes large. As shown by the strain hardening index SHI@10, the branched propylene-based polymer of the present invention is not relaxed at a high strain rate (10/sec), and the strain hardening index (SHI@10) is large. However, as shown by the strain hardening index SHI@1, it is relaxed at a low strain rate (1.0/sec), and the strain hardening index (SHI@1) is not too large. As a result, the difference between the strain hardening indices SHI@10 and SHI@1.0 can be as large as 0.10 or more. The upper limit of the difference can fall within a range of 0.25 or less.

The method for measuring the elongational viscosity and the method for calculating the strain hardening index (SHI) at each strain rate (ds/dt) are as follows.

The strain hardening index (SHI) can be obtained by, for example, uniaxial elongational viscosity measurement using the measurement devices and the measurement method as described in Polymer, Vol. 42, p. 8663 (2001). In the present invention, the strain hardening index (SHI) at each strain rate (ds/dt) can be measured by the following measurement method.

Device: ARES (manufactured by Rheometorics)

Jig: EXTENTIONAL VISCOSITY FIXTURE (manufactured by TA Instruments)

Measurement temperature: 180° C.

Strain rates: 10/sec, 1.0/sec

Production of test piece: A 18 mm×10 mm sheet (thickness 0.7 mm) is produced by press molding.

By the above measurement method, the data on time-dependent changes in the elongational viscosity (ηE) are obtained at a given strain rate (ds/dt); the measured data are plotted on a graph with the logarithm (Log(s)) of Hencky strain (s) on the x-axis and the logarithm (Log (ηE)) of the elongational viscosity (RE) on the y-axis; the slope of the elongational viscosity in the interval between Hencky strains 1 and 3, is specified from the graph; and the slope is determined as the strain hardening index (SHI) at the strain rate (ds/dt) in the measurement condition.

Property (11)

For the branched propylene-based polymer of the present invention, the lower limit of the melt tension (MT190) at 190° C. is approximately 0.5 g or more, and preferably 0.6 g or more. The upper limit of MT190 is approximately 5.0 g or less, preferably 4.0 g or less, and more preferably 3.0 g or less.

The melt tension (MT190) at 190° C. is measured by the following measurement method. Using a melt tension tester (such as CAPILOGRAPH 1B manufactured by Toyo Seiki Seisaku-sho, Ltd.), at a resin temperature of 190° C., the resin is extruded in a string form in the following conditions, and the extruded resin is wound on a roller. The tension detected by a pulley when winding the resin on the roller is determined as the melt tension (MT190).

Capillary: 2.1 mm in diameter

Cylinder diameter: 9.6 mm

Cylinder extrusion speed: 10 mm/min

Winding speed: 4.0 m/min

When resin breakage occurs at a winding speed of 4.0 m/min, the melt tension is considered as non-evaluable.

II. Method for Producing the Branched Propylene-Based Polymer

The method for producing the branched propylene-based polymer of the present invention is not particularly limited, as long as it is a method by which a branched propylene-based polymer having the above-described properties of the present invention, is obtained. An appropriate method is a macromer copolymerization method using a catalyst containing several metallocene compounds.

In the present invention, the mechanism of the macromer copolymerization method using several metallocene compounds, is presumed as follows.

The following polymerization behavior is exhibited when polymerization is initiated by use of a catalyst containing a metallocene compound that forms a catalyst that mainly produces a macromer (hereinafter, the metallocene compound will be referred to as "compound 1") and a metallocene compound that forms a catalyst that mainly copolymerizes a macromer and a propylene monomer and produces a polymer having a branched chain (the metallocene compound will be referred to as "compound 2").

To put it simply, by use of the propylene polymerization catalyst containing the compounds 1 and 2, a polymer having a breadth which includes such a molecular weight region, that the molecular weight and molecular weight distribution of the polymer produced from the catalyst containing the compound 1 (hereinafter, the catalyst will be referred to as "catalyst 1") and the molecular weight and molecular weight distribution of the polymer produced from the catalyst containing the compound 2 (hereinafter, the catalyst will be referred to as "catalyst 2") are overlaid on one another, is obtained.

In the process of forming the branched structure, when the polymer produced from the catalyst 1 contains a terminal vinyl group, the terminal vinyl group-containing polymer becomes a macromer (hereinafter, the macromer will be referred to as "macromer 1"). In addition, a copolymer of the propylene and the macromer 1 is produced from the catalyst 1; and a copolymer of the propylene and the macromer 1 is produced from the catalyst 2.

When the polymer produced from the catalyst 2 contains a terminal vinyl group, the terminal vinyl group-containing polymer becomes a macromer (hereinafter, the macromer will be referred to as "macromer 2"). In addition, a copolymer of the propylene and the macromer 2 is produced from the catalyst 1, and a copolymer of the propylene and the macromer 2 is produced from the catalyst 2.

When the polymer produced from the catalyst 1 and the polymer produced from the catalyst 2 become the macromer 1 and the macromer 2, respectively, a copolymer of the propylene, the macromer 1 and the macromer 2 is further produced from the catalyst 1, and a copolymer of the propylene, the macromer 1 and the macromer 2 is further produced from the catalyst 2.

As just described, depending on the molecular weight, molecular weight distribution and terminal vinyl rate of the polymer produced from the catalyst 1, the copolymerizability of the catalyst 1, the molecular weight, molecular weight distribution and terminal vinyl rate of the polymer produced from the catalyst 2, the copolymerizability of the catalyst 2, the ratio between the amounts of the catalysts 1 and 2, the steric positional relationship between the catalysts 1 and 2, and so on, the average molecular weight, high molecular weight and very high molecular weight of the branched propylene-based polymer, which is a final product, are changed. In addition, the number and distribution of the branches of the branched propylene-based polymer are changed. That is, Mn, Mw, Mz, $W100\times10^4$, $W200\times10^4$, g' ($100\times10^4$) and g' ($Mw_{abs}$) of the branched propylene-based polymer are thought to be changed.

A preferable method for producing the branched propylene-based polymer of the present invention is not limited by the mechanism. As the method, examples include, but are not limited to, the method described below.

II-1. Polymerization Catalyst

The propylene polymerization catalyst used to produce the branched propylene-based polymer of the present invention preferably comprises the following components [A-1], [A-2], [B] and [C]:

- component [A-1]: a metallocene compound which gives, when the propylene is homopolymerized at 70° C., a propylene homopolymer a-1 having a terminal vinyl rate (Rv) of 0.5 or more,
- component [A-2]: a metallocene compound which gives, when the propylene is homopolymerized at 70° C., a propylene homopolymer a-2 having a larger weight average molecular weight than the propylene homopolymer a-1 and having a terminal vinyl rate (Rv) of less than 0.5,
- component [B]: a compound or layered silicate which is reactive with the components [A-1] and [A-2] to form an ion pair, and
- component [C]: an organoaluminum compound.

II-1-1. Component [A-1]

The component [A-1] is a metallocene compound which gives, when the propylene is homopolymerized at 70° C., a propylene homopolymer a-1 having a terminal vinyl rate (Rv) of 0.5 or more. The component [A-1] is a metallocene compound which gives a terminal vinyl rate (Rv) of preferably 0.65 or more, more preferably 0.75 or more, and ideally 1.0 (one of the two terminals of all the molecular chains has a vinyl structure). A macromer synthesis process can be more efficiently implemented by use of the metallocene compound that forms the polymerization catalyst that produces the propylene homopolymer having a higher terminal vinyl rate.

The terminal vinyl rate (Rv) and the terminal vinylidene rate (Rvd) are determined by the following formulae:

$$\text{Terminal vinyl rate (Rv)}=[\text{Vi}]/\{(\text{Total terminal number}-\text{LCB number})/2\}$$

$$\text{Terminal vinylidene rate (Rvd)}=[\text{Vd}]/\{(\text{Total terminal number}-\text{LCB number})/2\}$$

(where [Vi] is the number of terminal vinyl groups per 1000 monomer units calculated by $^1$H-NMR; [Vd] is the number of terminal vinylidene groups per 1000 monomer units calculated by $^{1}$H-NMR; the total terminal number is the total number of terminals per 1000 monomer units calculated by $^{1}$H-NMR and $^{13}$C-NMR; and the LCB number is the number of LCBs per 1000 monomer units calculated by $^{13}$C-NMR).

[Relationship Between the Reaction Mechanism and the Terminal Structure]

The relationship between the reaction mechanism and terminal structure of the propylene homopolymerization will be described below.

In propylene polymerization, generally, a chain transfer reaction called β-hydrogen elimination is initiated as a termination reaction, and a polymer which has the propyl-vinylidene structure (vinylidene structure) represented by the structural formula (1-b) as the terminating terminal, is produced. In the case of using hydrogen, generally, chain transfer to hydrogen is preferentially initiated, and a polymer which has the i-butyl structure represented by the structural formula (1-c) as the terminating terminal, is produced. In the case of using a catalyst which contains a metallocene compound having a specific structure, a specific chain transfer reaction called β-methyl elimination is initiated, and a polymer which has the 1-propenyl structure (vinyl structure) represented by the structural formula (1-a) as the terminating terminal, is produced (reference: Macromol. Rapid Commun. 2000, 21, 1103-1107).

As the terminating terminal, the n-butyl structure represented by the structural formula (1-e) is produced when, in rare cases, chain transfer by hydrogen occurs after an irregular propylene insertion. Also, as the terminating terminal, a slight amount of the 1-butenyl structure represented by the structural formula (1-f) or a slight amount of the terminal vinylene structure (2-butenyl structure) represented by the structural formula (1-g) are thought to be produced when β-hydrogen elimination occurs after an irregular propylene insertion.

The initiating terminal becomes the n-propyl structure represented by the structural formula (1-h) when the first propylene is inserted into the central metal after chain transfer by hydrogen or β-hydrogen elimination occurs as the termination reaction, or the initiating terminal becomes the i-butyl structure represented by the structural formula (1-c) when the first propylene is inserted into the central metal after (3-methyl elimination occurs as the termination reaction.

The initiating terminal becomes the 2,3-dimethylbutyl structure represented by the structural formula (1-i) when, in rare cases, the first propylene is irregularly inserted into the central metal after chain transfer by hydrogen occurs as the termination reaction or after β-hydrogen elimination occurs as the termination reaction, or the initiating terminal becomes the 3,4-dimethylpentyl structure represented by the structural formula (1-j) when, in rare cases, the first propylene is irregularly inserted into the central metal after β-methyl elimination occurs as the termination reaction.

All of the initiating terminals become saturated terminals. Accordingly, one polymer chain does not have two unsaturated terminals at the same time.

Also, a polymer having the i-butenyl structure represented by the structural formula (1-d) at a terminal may be produced by isomerization.

The internal vinylidene structure represented by the structural formula (1-k) is an olefin structure produced inside the polymer chain when a propylene is further inserted into an intermediate which is formed by hydrogen desorption following the production of an unsaturated terminal.

Accordingly, among the above structural formulae, the structural formula (1-c) and the structural formula (1-h) become a main saturated terminal each by the main reaction, and the structural formula (1-a) and the structural formula (1-b) become a main unsaturated terminal each by the main reaction. The number of other terminal structures is very small compared to the number of the main terminal structures.

The polymer having, among the above terminal structures, the structures represented by the structural formulae (1-a) and (1-f) at the terminal can be a macromer. The structural formulae (1-a) and (1-f) have in common that two carbons at the most terminal have a vinyl structure; moreover, the structural formulae (1-a) and (1-f) have no difference in the function of being copolymerizable.

However, the 1-propenyl structure is a terminal which is produced as a result of β-methyl elimination that occurs after a regular propylene insertion; meanwhile, the 1-butenyl structure is a structure which is produced as a result of a side reaction in which, in rare cases, β-hydrogen elimination occurs after an irregular propylene insertion. Accordingly, the amount of the 1-butenyl structure is presumed to be very small with respect to the amount of the 1-propenyl structure. The ratio of production of the 1-butenyl structure to the-propenyl structure is thought to be similar to or less than the probability of the production of heterologous bonds. That is, most of the number [Vi] the terminal vinyl groups is presumed to be the 1-propenyl structure resulting from β-methyl elimination that occurs after a regular propylene insertion.

Structural Formula (1-a)

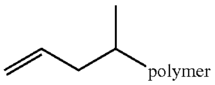

1-Propenyl

Structural Formula (1-b)

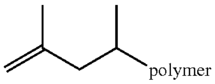

Vinylidene

Structural Formula (1-c)

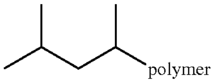

i-Butyl

Structural Formula (1-d)

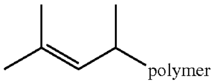

i-Butenyl

Structural Formula (1-e)

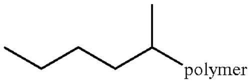

n-Butyl

Structural Formula (1-f)

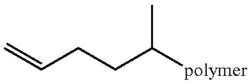

1-Butenyl

-continued

Structural Formula (1-g)

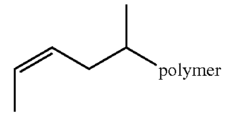

Terminal vinylene (2-Butenyl)

Structural Formula (1-h)

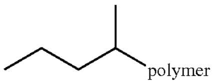

n-Propyl

Structural Formula (1-i)

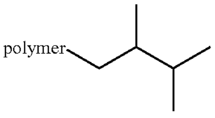

2,3-Dimethylbutyl

Structural Formula (1-j)

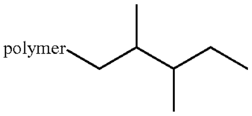

3,4-Dimethylpentyl

Structural Formula (1-k)

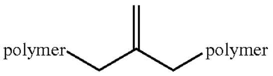

Internal vinylidene

[Method for Evaluating the Terminal Vinyl Rate (Rv) and the Terminal Vinylidene Rate (Rvd)]

The propylene polymerization conditions when the terminal vinyl rate (Rv) and terminal vinylidene rate (Rvd) of the catalyst component are determined, will be described in detail.

First, the inside of a 3 L autoclave is purged with propylene; 2.86 mL of solution of triisobutylaluminum in heptane (143.4 mg/mL) is fed into the autoclave; 240 mL of hydrogen is introduced into the autoclave; 750 g of liquefied propylene is introduced into the autoclave; and then the temperature of the autoclave is increased to 70° C. Then, the catalyst is fed under pressure to the polymerization tank; and polymerization is carried out at 70° C. for one hour. Finally, unreacted propylene is quickly purged to stop the polymerization. Accordingly, a propylene polymer is obtained.

The terminal vinyl rate (Rv) is an index of the ratio of the number of the terminal vinyl groups to the total number of the polymer chains. The terminal vinylidene rate (Rvd) is an index of the ratio of the number of the terminal vinylidene groups to the total number of the polymer chains.

The calculation methods thereof are shown below. First, each of the number of the unsaturated terminals and that of the saturated terminals is obtained from $^{1}$H-NMR and $^{13}$C-NMR as a number per 1000 monomers; the total terminal number is determined as the total number of the saturated and unsaturated terminals; in the same manner, the LCB number is obtained from $^{13}$C-NMR as a number per 1000 monomers; the LCB number is subtracted from the total terminal number, and one-half (½) of the thus-obtained number is determined as the total polymer number; and the number [Vi] of the terminal vinyl groups, which are unsaturated terminals, is divided by the total polymer number, thereby calculating the terminal vinyl rate (Rv). The number (Rvd) of the terminal vinylidene groups, which are unsaturated terminals, is divided by the total polymer number, thereby calculating the terminal vinylidene rate (Rvd).

Further details of the calculation method are as follows.

<Method for Calculating the Numbers of the Saturated Terminals>

The numbers of the following main saturated terminals are obtained by the following formulae. In each formula, the integrated intensity of the $^{13}$C signal is used as the number of the saturated terminals per 1000 monomers.

$$[\text{i-butyl}]=I_{i\text{-}butyl}\times 1000/I_{total\text{-}C}$$ Structural formula (1-c)

$$[\text{n-butyl}]=I_{nbu}\times 1000/I_{total\text{-}C}$$ Structural formula (1-e)

$$[\text{n-propyl}]=I_{npr}\times 1000/I_{total\text{-}C}$$ Structural formula (1-h)

$$[\text{2,3-dimethylbutyl}]=I_{2,3\text{-}dime}\times 1000/I_{total\text{-}C}$$ Structural formula (1-i)

$$[\text{3,4-dimethylpentyl}]=I_{3,4\text{-}dime}\times 1000/I_{total\text{-}C}$$ Structural formula (1-j)

When another type of saturated terminals are detected in addition to the above-mentioned main saturated terminals, in the same manner as above, the number of the saturated terminals of another type is calculated as the number per 1000 monomers, using the values mentioned in known literatures.

The $I_{i\text{-}butyl}$, $I_{nbu}$, $I_{npr}$, $I_{2,3\text{-}dime}$ and $I_{3,4\text{-}dime}$ denote the characteristic values of the signals based on the structural formulae (1-c), (1-e), (1-h), (1-i) and (1-j), respectively. They are amounts represented by the following formulae.

$$I_{i\text{-}butyl}=I_{23.80\text{-}23.65}$$

$$I_{nbu}=I_{36.99\text{-}36.88}$$

$$I_{npr}=I_{39.71\text{-}39.61}$$

$$I_{2,3\text{-}dime}=(I_{16.30\text{-}16.20}+I_{43.05\text{-}43.00})/2$$

$$I_{3,4\text{-}dime}=I_{12.0\text{-}11.60}$$

The $I_{total\text{-}C}$ value is an amount represented by the following formula.

$$I_{total\text{-}C}=I_{i\text{-}butyl}+I_{nbu}+I_{npr}+I_{2,3\text{-}dime}+I_{3,4\text{-}dime}+I_{1,2\text{-}P}+I_{2,1\text{-}P}+I_{1,3\text{-}P}$$

When there are other types of saturated structures in addition to the above-mentioned main saturated structures, the number of all detected structures is added to the above formula.

The $I_{1,2\text{-}P}$ is the characteristic value of the signal based on the 1,2-inserted propylene bond; the $I_{2,1\text{-}P}$ is the characteristic value of the signal based on the 2,1-inserted propylene bond; and the $I_{1,3\text{-}P}$ is the characteristic value of the signal based on the 1,3-inserted propylene bond. They are amounts represented by the following formulae.

$$I_{1,2\text{-}P}=I_{48.80\text{-}44.50}$$

$$I_{2,1\text{-}P}=(I_{34.68\text{-}34.63}+I_{35.47\text{-}35.40}+I_{35.94\text{-}35.70})/2$$

$$I_{1,8\text{-}P}=I_{37.50\text{-}37.20}/2$$

<Method for Calculating the Numbers of the Unsaturated Terminals>

The numbers of the unsaturated terminals are obtained by the following formulae. In each formula, the integrated intensity of the 41 signal is used as the number per 1000 monomers.

In $^{1}$H-NMR, the proton signals of the unsaturated bonds of the 1-propenyl structure represented by the structural formula (1-a) and the 1-butenyl structure represented by the structural formula (1-f) are detected in the state that they are overlaid on the signals of 5.08 ppm to 4.85 ppm and 5.86 ppm to 5.69 ppm in the $^{1}$H-NMR spectrum. Accordingly, the number of the terminal vinyl group, that is, [Vi] is determined as the total number of the 1-propenyl structure and the 1-butenyl structure.

$[Vi]=I_{vi}\times 1000/I_{total}$ Structural formula (1-a)+Structural formula (1-f)

$[Vd]=I_{vd}\times 1000/I_{total}$ Structural formula (1-b)

In the same manner as above, the number of the i-butenyl group [i-butenyl], the number of the vinylene terminal [terminal vinylene] and the number of the internal vinylidene [internal vinylidene] are obtained by the following formulae.

$[\text{i-Butenyl}]=I_{ibu}\times 1000/I_{total}$ Structural formula (1-d)

$[\text{Terminal vinylene}]=I_{vnl}\times 1000/I_{total}$ Structural formula (1-g)

$[\text{Internal vinylidene}]=I_{ivd}\times 1000/I_{total}$ Structural formula (1-k)

The $I_{vi}$, $I_{vd}$, $I_{ibu}$, $I_{vnl}$ and $I_{ivd}$ are characteristic values of the signals based on the structural formula (1-a)+the structural formula (1-f), the structural formula (1-b), the structural formula (1-d), the structural formula (1-g) and the structural formula (1-k), respectively. They are amounts represented by the following formulae.

$I_{vi}=(I_{5.08\text{-}4.85}+I_{5.86\text{-}5.69})/3$ $I_{vd}=(I_{4.78\text{-}4.65})/2$ $I_{ibu}=I_{5.26\text{-}5.08}$ $I_{vnl}=(I_{5.58\text{-}5.26})/2$ $I_{ivd}=(I_{4.85\text{-}4.78})/2$ The $I_{total}$ is an amount represented by the following formula.

$I_{total}=I_{main}/6+I_{vi}+I_{vd}+I_{ibu}+I_{vnl}+I_{ivd}$

When there are other types of unsaturated structures in addition to the above-mentioned main unsaturated structures, the number of all detected terminals is added to the above formula.

The $I_{main}$ is the sum of the integrated intensities of the proton signals which are detected from 4.00 ppm to 0.00 ppm in the $^{1}$H-NMR spectrum and which are bound to the saturated carbons of the polymer chains including the terminals.

<Method for Calculating the LCB Number>

The LCB number is obtained as a number per 1000 monomers by the method described in "Property (9)".

<Method for Calculating the Total Terminal Number>

The total terminal number is the total number of terminals per 1000 monomer units calculated by $^{1}$H-NMR and $^{13}$C-NMR.

<Method for Calculating the Terminal Vinyl Rate>

The terminal vinyl rate is calculated by the following formula, using the above-obtained [Vi], total terminal number and LCB number.

Terminal vinyl rate (Rv)=[Vi]/{(Total terminal number−LCB number)/2}

Terminal vinylidene rate (Rvd)=[Vd]/{(Total terminal number−LCB number)/2}

As the component [A-1], examples include, but are not limited to, a bisindene complex having a bulky heterocyclic group at the 2-position of the indenyl group and an optionally substituted aryl group or heterocyclic group containing nitrogen, oxygen or sulfur, or the like at the 4-position. As the preferred embodiments of the component [A-1], examples include, but are not limited to, the following structure.

General Formula (a1)

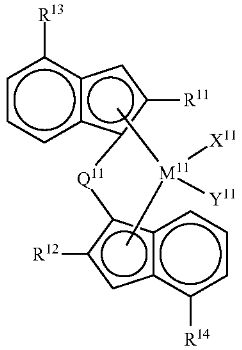

(where $R^{11}$ and $R^{12}$ each independently represents a C4-C16 heterocyclic group containing nitrogen, oxygen or sulfur; Rn and $R^{14}$ each independently represents a C6-C30 aryl group optionally containing one or more heteroatoms selected from halogen, silicon, oxygen, sulfur, nitrogen, boron and phosphorus, or a C6-C16 heterocyclic group containing nitrogen, oxygen or sulfur; $Q^{11}$ represents a C1-C20 divalent hydrocarbon group or a silylene or germylene group optionally containing a C1-C20 hydrocarbon group; $M^{11}$ represents zirconium or hafnium; $X^{11}$ and $Y^{11}$ each independently represents a hydrogen atom, a halogen atom, a C1-C20 hydrocarbon group, a silyl group containing a C1-C20 hydrocarbon group, a C1-C20 halogenated hydrocarbon group, an amino group or a C1-C20 alkylamino group.)

The C4-C16 heterocyclic group containing nitrogen, oxygen or sulfur as $R^{11}$ and $R^{12}$, is preferably a 2-furyl group, a substituted 2-furyl group, a substituted 2-thienyl group or a substituted 2-furfuryl group, and more preferably a substituted 2-furyl group.

When each of $R^{11}$ and $R^{12}$ is a group selected from C4-C16 heterocyclic groups containing nitrogen, oxygen or sulfur, the terminal vinyl rate (Rv) can be increased. Especially, by introducing a substituent of appropriate size onto the heterocyclic group, the relative positional relationship between the heterocycle, a coordination site on the transition metal, and a growing polymer chain can be made appropriate, and the terminal vinyl rate (Rv) can be further increased, accordingly.

The substituent of the substituted 2-furyl group, 2-thienyl group and 2-furfuryl group is preferably a C1-C4 hydrocarbon group.

Each of $R^{11}$ and $R^{12}$ is particularly preferably a 5-methyl-2-furyl group. Also, $R^{11}$ and $R^{12}$ are preferably the same groups.

$R^{13}$ and $R^{14}$ each independently represents a C6-C30 aryl group optionally containing one or more heteroatoms selected from halogen, silicon, oxygen, sulfur, nitrogen, boron and phosphorus, or a C6-C16 heterocyclic group containing nitrogen, oxygen or sulfur.

Especially, by making $R^{13}$ and $R^{14}$ bulkier, a propylene polymer having higher stereoregularity, less heterologous bonds and a high terminal vinyl rate is obtained.

Accordingly, each of $R^{13}$ and $R^{14}$ is preferably an aryl group optionally containing, as a substituent on the aryl cyclic skeleton, one or more of a C1-C6 hydrocarbon group, a silyl group containing C1-C6 hydrocarbon group, a C1-C6 halogen-containing hydrocarbon group, and a halogen atom so that the number of the carbon atoms ranges from 6 to 16. As such $R^{13}$ and $R^{14}$, examples include, but are not limited to, a 4-t-butylphenyl group, a 2,3-dimethylphenyl group, a 3,5-di-t-butylphenyl group, a 4-chlorophenyl group, a 4-trimethylsilylphenyl group, a 1-naphthyl group and a 2-naphthyl group.

Each of $R^{13}$ and $R^{14}$ is more preferably a phenyl group containing, as a substituent, one or more of a C1-C6 hydrocarbon group, a silyl group containing a C1-C6 hydrocarbon group, a C1-C6 halogen-containing hydrocarbon group, and a halogen atom so that the number of the carbon atoms ranges from 6 to 16. The substitution site is preferably the 4-position on the phenyl group. As such $R^{13}$ and $R^{14}$, examples include, but are not limited to, a 4-t-butylphenyl group, a 4-biphenylyl group, a 4-chlorophenyl group and a 4-trimethylsilylphenyl group. Also, Rn and R 14 are preferably the same groups.

Each of $X^{11}$ and $Y^{11}$ is an ancillary ligand and reacts with the component [B] to produce active metallocene having olefin polymerizing ability. Accordingly, the ligand type of $X^{11}$ and $Y^{11}$ is not particularly limited, as long as this object is achieved. $X^{11}$ and $Y^{11}$ each independently represents a hydrogen atom, a halogen atom, a C1-C20 hydrocarbon group, a silyl group containing a C1-C20 hydrocarbon group, a C1-C20 halogenated hydrocarbon group, an amino group or a C1-C20 alkylamino group.

$Q^{11}$ represents a C1-C20 divalent hydrocarbon group or a silylene or germylene group optionally containing a C1-C20 hydrocarbon group, which bonds the two five-membered rings. When there are two hydrocarbon groups on the silylene or germylene group, they may be bound to form a cyclic structure.

As $Q^{11}$, examples include, but are not limited to, the following: an alkylene group such as methylene, methylmethylene, dimethylmethylene and 1,2-ethylene; an arylalkylene group such as diphenylmethylene; a silylene group; an alkylsilylene group such as methylsilylene, dimethylsilylene, diethylsilylene, di(n-propyl)silylene, di(i-propyl)silylene and di(cyclohexyl)silylene; an (alkyl)(aryl)silylene group such as methyl(phenyl)silylene; an arylsilylene group such as diphenylsilylene; an alkyloligosilylene group such as tetramethyldisilylene; a germylene group; and an alkylgermylene group, an (alkyl) (aryl)germylene group and an arylgermylene group, each of which is obtained by substituting germanium for silicon in the above silylene group containing a C1-C20 divalent hydrocarbon group. Of them, a silylene group containing a C1-C20 hydrocarbon group or a germylene group containing a C1-C20 hydrocarbon group is preferred, and an alkylsilylene group or an alkylgermylene group is particularly preferred.

Of the compounds represented by the general formula (a1), preferred compounds are as follows, for example.

(1) dichloro[1,1'-dimethylsilylene bis{2-(2-furyl)-4-phenylindenyl}]hafnium,
(2) dichloro[1,1'-dimethylsilylene bis{2-(2-thienyl)-4-phenylindenyl}]hafnium,
(3) dichloro[1,1'-dimethylsilylene bis{2-(5-methyl-2-furyl)-4-phenylindenyl}]hafnium,
(4) dichloro[1,1'-diphenylsilylene bis{2-(5-methyl-2-furyl)-4-phenylindenyl}]hafnium,
(5) dichloro[1,1'-dimethylgermylene bis{2-(5-methyl-2-furyl)-4-phenylindenyl}]hafnium,
(6) dichloro[1,1'-dimethylgermylene bis{2-(5-methyl-2-thienyl)-4-phenylindenyl}]hafnium,
(7) dichloro[1,1'-dimethylsilylene bis{2-(5-t-butyl-2-furyl)-4-phenylindenyl}]hafnium,
(8) dichloro[1,1'-dimethylsilylene bis{2-(5-trimethylsilyl-2-furyl)-4-phenylindenyl}]hafnium,
(9) dichloro[1,1'-dimethylsilylene bis{2-(5-phenyl-2-furyl)-4-phenylindenyl}]hafnium,
(10) dichloro[1,1'-dimethylsilylene bis{2-(4,5-dimethyl-2-furyl)-4-phenylindenyl}]hafnium,
(11) dichloro[1,1'-dimethylsilylene bis{2-(2-benzofuryl)-4-phenylindenyl}]hafnium,
(12) dichloro[1,1'-dimethylsilylene bis{2-(2-furfuryl)-4-phenylindenyl}]hafnium,
(13) dichloro[1,1'-dimethylsilylene bis{2-(5-methyl-2-furyl)-4-(4-chlorophenyl)indenyl}]hafnium,
(14) dichloro[1,1'-dimethylsilylene bis{2-(5-t-butyl-2-furyl)-4-(4-chlorophenyl)indenyl}]hafnium,
(15) dichloro[1,1'-dimethylsilylene bis{2-(5-methyl-2-furyl)-4-(4-fluorophenyl)indenyl}]hafnium,
(16) dichloro[1,1'-dimethylsilylene bis{2-(5-methyl-2-furyl)-4-(4-trifluoromethylphenyl)indenyl}]hafnium,
(17) dichloro[1,1'-dimethylsilylene bis{2-(5-methyl-2-furyl)-4-(4-i-propylphenyl)indenyl}]hafnium,
(18) dichloro[1,1'-dimethylsilylene bis{2-(5-methyl-2-furyl)-4-(4-t-butylphenyl)indenyl}]hafnium,
(19) dichloro[1,1'-dimethylsilylene bis{2-(5-t-butyl-2-furyl)-4-(4-i-propylphenyl)indenyl}]hafnium,
(20) dichloro[1,1'-dimethylsilylene bis{2-(5-t-butyl-2-furyl)-4-(4-t-butylphenyl)indenyl}]hafnium,
(21) dichloro[1,1'-dimethylsilylene bis{2-(5-methyl-2-furyl)-4-(4-trimethylsilylphenyl)indenyl}]hafnium,
(22) dichloro[1,1'-dimethylsilylene bis{2-(2-furyl)-4-(1-naphthyl)indenyl}]hafnium,
(23) dichloro[1,1'-dimethylsilylene bis(2-(2-furyl)-4-(2-naphthyl)indenyl)]hafnium,
(24) dichloro[1,1'-dimethylsilylene bis(2-(2-furyl)-4-(2-phenanthryl)indenyl)]hafnium,
(25) dichloro[1,1'-dimethylsilylene bis(2-(2-furyl)-4-(9-phenanthryl)indenyl)]hafnium,
(26) dichloro[1,1'-dimethylsilylene bis{2-(5-methyl-2-furyl)-4-(4-biphenylyl)indenyl}]hafnium,
(27) dichloro[1,1'-dimethylsilylene bis{2-(5-methyl-2-furyl)-4-(1-naphthyl)indenyl}]hafnium,
(28) dichloro[1,1'-dimethylsilylene bis{2-(5-methyl-2-furyl)-4-(2-naphthyl)indenyl}]hafnium,
(29) dichloro[1,1'-dimethylsilylene bis{2-(5-t-butyl-2-furyl)-4-(1-naphthyl)indenyl}]hafnium, and
(30) dichloro[1,1'-dimethylsilylene bis{2-(5-t-butyl-2-furyl)-4-(2-naphthyl)indenyl}]hafnium.

Of them, more preferred are the following compounds:

(3) dichloro[1,1'-dimethylsilylene bis{2-(5-methyl-2-furyl)-4-phenylindenyl}]hafnium,
(7) dichloro[1,1'-dimethylsilylene bis{2-(5-t-butyl-2-furyl)-4-phenylindenyl}]hafnium,
(13) dichloro[1,1'-dimethylsilylene bis{2-(5-methyl-2-furyl)-4-(4-chlorophenyl)indenyl}]hafnium,
(14) dichloro[1,1'-dimethylsilylene bis{2-(5-t-butyl-2-furyl)-4-(4-chlorophenyl)indenyl}]hafnium,
(17) dichloro[1,1'-dimethylsilylene bis{2-(5-methyl-2-furyl)-4-(4-i-propylphenyl)indenyl}]hafnium,
(18) dichloro[1,1'-dimethylsilylene bis{2-(5-methyl-2-furyl)-4-(4-t-butylphenyl)indenyl}]hafnium,
(19) dichloro[1,1'-dimethylsilylene bis{2-(5-t-butyl-2-furyl)-4-(4-i-propylphenyl)indenyl}]hafnium,
(20) dichloro[1,1'-dimethylsilylene bis{2-(5-t-butyl-2-furyl)-4-(4-t-butylphenyl)indenyl}]hafnium,
(21) dichloro[1,1'-dimethylsilylene bis{2-(5-methyl-2-furyl)-4-(4-trimethyl silylphenyl)indenyl}]hafnium,

(26) dichloro[1,1'-dimethyl silylene bis{2-(5-methyl-2-furyl)-4-(4-biphenylyl)indenyl}]hafnium,
(28) dichloro[1,1'-dimethyl silylene bis{2-(5-methyl-2-furyl)-4-(2-naphthyl)indenyl}]hafnium, and
(30) dichloro[1,1'-dimethylsilylene bis{2-(5-t-butyl-2-furyl)-4-(2-naphthyl)indenyl}]hafnium.

Of them, still more preferred are the following compounds:
(13) dichloro[1,1'-dimethylsilylene bis{2-(5-methyl-2-furyl)-4-(4-chlorophenyl)indenyl}]hafnium,
(17) dichloro[1,1'-dimethylsilylene bis{2-(5-methyl-2-furyl)-4-(4-i-propylphenyl)indenyl}]hafnium,
(18) dichloro[1,1'-dimethylsilylene bis{2-(5-methyl-2-furyl)-4-(4-t-butylphenyl)indenyl}]hafnium, and
(21) dichloro[1,1'-dimethylsilylene bis{2-(5-methyl-2-furyl)-4-(4-trimethylsilylphenyl)indenyl}]hafnium.

II-1-2. Component [A-2]

The component [A-2] is a metallocene compound which gives, when the propylene is homopolymerized at 70° C., a propylene homopolymer a-2 having a larger weight average molecular weight than the propylene homopolymer a-1 and having a terminal vinyl rate (Rv) of less than 0.5.

The component [A-2] is a metallocene compound which forms a polymerization catalyst that can copolymerize a propylene monomer and a propylene macromer.

The component [A-2] is a metallocene compound which gives a terminal vinyl rate (Rv) of preferably 0.30 or less, more preferably 0.10 or less, and ideally 0 (no vinyl structure is produced).

The component [A-2] produces a polymer having a higher molecular weight than the polymer produced by the component [A-1], when the propylene is homopolymerized at 70° C. using the same amount of hydrogen.

By using, as the component [A-2], the metallocene compound that forms a polymerization catalyst that produces a propylene homopolymer having a high molecular weight and a low terminal vinyl rate, the production of a high-molecular-weight branched component having a long branch is suppressed, and a reaction in which the low-molecular-weight macromer produced by the component [A-1] is copolymerized by the component [A-2], can be preferentially caused.

The terminal vinyl rate (Rv) and the terminal vinylidene rate (Rvd) are evaluated by the same evaluation method as the component [A-1].

As described above, the efficiency that the macromer produced by the component [A-1] is copolymerized by the component [A-2] to produce a branch, is worse than the efficiency that the macromer is copolymerized by the component [A-1] itself to produce a branch. Accordingly, the branched propylene-based polymer of the present invention can be produced by using that the branch density of the branched polymer derived from the component [A-2] is smaller than that of the branched polymer derived from the component [A-1].

To obtain Mn, Mw, Mz, $W100\times10^4$ and $g'(100\times10^4)$, which are characteristic of the branched propylene-based polymer of the present invention, and to obtain the average molecular weight and molecular weight distribution such that $W200\times10^4$, $g'(Mw_{abs})$ and $[g'(Mw_{abs})-g'(100\times10^4)]$ preferably satisfy the formula (3), the component [A-2] needs to produce a polymer having a higher molecular weight than the component [A-1].

As with the method for evaluating the terminal vinyl rate (Rv) and the terminal vinylidene rate (Rvd), the above characteristics can be evaluated by producing each polymer using the component [A-2] or [A-1] by bulk polymerization at 70° C., measuring each polymer by GPC to obtain each weight average molecular weight (Mw), and comparing each weight average molecular weight.

As the component [A-2], examples include, but are not limited to, a metallocene compound represented by the following general formula (a2):

General Formula (a2)

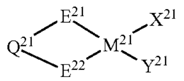

(where $E^{21}$ and $E^{22}$ each independently represents a cyclopentadienyl group, an indenyl group, a fluorenyl group or an azulenyl group and optionally contains a substituent (however, the substituent is not a C4-C16 heterocyclic group containing nitrogen, oxygen or sulfur); $Q^{21}$ represents a C1-C20 divalent hydrocarbon group or a silylene or germylene group optionally containing a C1-C20 hydrocarbon group; $M^{21}$ represents zirconium or hafnium; $X^{21}$ and $Y^{21}$ each independently represents a hydrogen atom, a halogen atom, a C1-C20 hydrocarbon group, a silyl group containing a C1-C20 hydrocarbon group, a C1-C20 halogenated hydrocarbon group, an amino group or a C1-C20 alkylamino group.)

$E^{21}$ and $E^{22}$ each independently represents a cyclopentadienyl group, an indenyl group, a fluorenyl group or an azulenyl group and optionally contains a substituent.

However, the substituent is not a C4-C16 heterocyclic group containing nitrogen, oxygen or sulfur.

Preferred are a substituted cyclopentadienyl group, a substituted indenyl group and a substituted azulenyl group.

As the substituent, examples include, but are not limited to, a C1-C6 hydrocarbon group, a C6-C30 aryl group optionally containing one or more heteroatoms selected from halogen, silicon, oxygen, sulfur, nitrogen, boron and phosphorus, a halogen atom, an alkoxy group and a trialkylsilyl group.

The C1-C6 hydrocarbon group may be the same as the C1-C6 hydrocarbon group as Rn and R 22 in the below-described general formula (a3). The C6-C30 aryl group optionally containing one or more heteroatoms selected from halogen, silicon, oxygen, sulfur, nitrogen, boron and phosphorus, may be the same as that as $R^{23}$ and $R^{24}$ in the below-described general formula (a3). As the halogen atom, examples include, but are not limited to, a fluorine atom and a chlorine atom; as the C1-C6 alkoxy group, examples include, but are not limited to, a methoxy group and an ethoxy group; and as the trialkylsilyl group, examples include, but are not limited to, a trimethylsilyl group.

Each of $X^{21}$ and $Y^{21}$ is an ancillary ligand and reacts with the component [B] to produce active metallocene having olefin polymerizing ability. Accordingly, the ligand type of $X^{21}$ and $Y^{21}$ is not particularly limited, as long as this object is achieved. $X^{21}$ and $Y^{21}$ each independently represents a hydrogen atom, a halogen atom, a C1-C20 hydrocarbon group, a silyl group containing a C1-C20 hydrocarbon group, a C1-C20 halogenated hydrocarbon group, an amino group or a C1-C20 alkylamino group.

$Q^{21}$ represents a C1-C20 divalent hydrocarbon group which bonds the two five-membered rings and which cross-links the two conjugated five-membered ring ligands via a C1 or C2 carbon, or a silylene or germylene group optionally containing a C1-C20 hydrocarbon group. When there are two hydrocarbon groups on the silylene or germylene group, they may be bound to form a cyclic structure.

As $Q^{21}$, examples include, but are not limited to, the following: an alkylene group such as methylene, methylmethylene, dimethylmethylene and 1,2-ethylene; an arylalkylene group such as diphenylmethylene; a silylene group; an alkylsilylene group such as methylsilylene, dimethylsilylene, diethylsilylene, di(n-propyl)silylene, di(i-propyl)silylene and di(cyclohexyl)silylene; an (alkyl) (aryl)silylene group such as methyl(phenyl)silylene; an arylsilylene group such as diphenylsilylene; an alkyloligosilylene group such as tetramethyldisilylene; a germylene group; and an alkylgermylene group, an (alkyl) (aryl)germylene group and an arylgermylene group, each of which is obtained by substituting germanium for silicon in the above silylene group containing a C1-C20 divalent hydrocarbon group.

Of them, a silylene group containing a C1-C20 hydrocarbon group or a germylene group containing a C1-C20 hydrocarbon group is preferred, and a C1-C20 alkylsilylene group or a C1-C20 alkylgermylene group is particularly preferred.

$M^{21}$ is zirconium or hafnium, and it is preferably hafnium.

As the compound described above, examples include, but are not limited to, a metallocene compound represented by the following general formula (a3):

General Formula (a3)

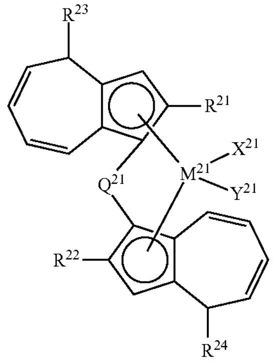

(where $R^{21}$ and $R^{22}$ each independently represents a C1-C6 hydrocarbon group; $R^{23}$ and $R^{24}$ each independently represents a C6-C30 aryl group optionally containing one or more heteroatoms selected from halogen, silicon, oxygen, sulfur, nitrogen, boron and phosphorus; $Q^{21}$ represents a C1-C20 divalent hydrocarbon group or a silylene or germylene group optionally containing a C1-C20 hydrocarbon group; $M^{21}$ represents zirconium or hafnium; $X^{21}$ and $Y^{21}$ each independently represents a hydrogen atom, a halogen atom, a C1-C20 hydrocarbon group, a silyl group containing a C1-C20 hydrocarbon group, a C1-C20 halogenated hydrocarbon group, an amino group or a C1-C20 alkylamino group.)

$R^{21}$ and $R^{22}$ each independently represents a C1-C6 hydrocarbon group, preferably an alkyl group, and more preferably a C1-C4 alkyl group. As $R^{21}$ and $R^{22}$, examples include, but are not limited to, a methyl group, an ethyl group, an n-propyl group, an i-propyl group, an n-butyl group, an i-butyl group, a sec-butyl group, an n-pentyl group, an i-pentyl group and an n-hexyl group. Of them, a methyl group, an ethyl group and an n-propyl group are preferred.

$R^{23}$ and $R^{24}$ each independently represents a C6-C30 (preferably C6-C24) aryl group optionally containing one or more heteroatoms selected from halogen, silicon, oxygen, sulfur, nitrogen, boron and phosphorus. As the aryl group, examples include, but are not limited to, a phenyl group, a biphenylyl group and a naphthyl group, each of which may contain a substituent. Preferred examples include, but are not limited to, a phenyl group, a 3-chlorophenyl group, a 4-chlorophenyl group, a 3-fluorophenyl group, a 4-fluorophenyl group, a 4-methylphenyl group, a 4-i-propylphenyl group, a 4-t-butylphenyl group, a 4-trimethylsilylphenyl group, a 4-(2-fluoro-4-biphenylyl) group, a 4-(2-chloro-4-biphenylyl) group, a 1-naphthyl group, a 2-naphthyl group, a 4-chloro-2-naphthyl group, a 3-methyl-4-trimethylsilylphenyl group, a 3,5-dimethyl-4-t-butylphenyl group, a 3,5-dimethyl-4-trimethylsilylphenyl group and a 3,5-dichloro-4-trimethylsilylphenyl group.

In the general formula (a3), $Q^{21}$, $M^{21}$, $X^{21}$ and $Y^{21}$ may be the same as $Q^{21}$, $M^{21}$, $X^{21}$ and $Y^{21}$ in the general formula (a2), respectively.

As the metallocene compound represented by the general formula (a3), examples include, but are not limited to, the following. For the sake of simplicity, the following examples only show typical compound examples, in each of which the central metal is hafnium. However, it is obvious that similar zirconium compounds are also applicable as the metallocene compound, and any kind of ligand, crosslinking group or ancillary ligand is also applicable as the metallocene compound.

(1) Dichloro{1,1'-dimethylsilylene bis(2-methyl-4-phenyl-4-hydroazulenyl)}hafnium
(2) Dichloro[1,1'-dimethylsilylene bis{2-methyl-4-(4-chlorophenyl)-4-hydroazulenyl}]hafnium
(3) Dichloro[1,1'-dimethylsilylene bis{2-methyl-4-(4-t-butylphenyl)-4-hydroazulenyl}]hafnium
(4) Dichloro[1,1'-dimethylsilylene bis{2-methyl-4-(4-trimethylsilylphenyl)-4-hydroazulenyl}]hafnium
(5) Dichloro[1,1'-dimethylsilylene bis{2-methyl-4-(3-chloro-4-t-butylphenyl)-4-hydroazulenyl}]hafnium
(6) Dichloro[1,1'-dimethylsilylene bis{2-methyl-4-(3-methyl-4-t-butylphenyl)-4-hydroazulenyl}]hafnium
(7) Dichloro[1,1'-dimethylsilylene bis{2-methyl-4-(3-chloro-4-trimethylsilylphenyl)-4-hydroazulenyl}]hafnium
(8) Dichloro[1,1'-dimethylsilylene bis{2-methyl-4-(3-methyl-4-trimethylsilylphenyl)-4-hydroazulenyl}]hafnium
(9) Dichloro[1,1'-dimethylsilylene bis{2-methyl-4-(1-naphthyl)-4-hydroazulenyl}]hafnium
(10) Dichloro[1,1'-dimethylsilylene bis{2-methyl-4-(2-naphthyl)-4-hydroazulenyl}]hafnium
(11) Dichloro[1,1'-dimethylsilylene bis{2-methyl-4-(4-chloro-2-naphthyl)-4-hydroazulenyl}]hafnium
(12) Dichloro[1,1'-dimethylsilylene bis{2-methyl-4-(2-fluoro-4-biphenylyl)-4-hydroazulenyl}]hafnium
(13) Dichloro[1,1'-dimethylsilylene bis{2-methyl-4-(2-chloro-4-biphenylyl)-4-hydroazulenyl}]hafnium
(14) Dichloro[1,1'-dimethylsilylene bis{2-methyl-4-(9-phenanthryl)-4-hydroazulenyl}]hafnium
(15) Dichloro[1,1'-dimethylsilylene bis{2-ethyl-4-(4-chlorophenyl)-4-hydroazulenyl}]hafnium
(16) Dichloro[1,1'-dimethylsilylene bis{2-n-propyl-4-(3-chloro-4-trimethylsilylphenyl)-4-hydroazulenyl}]hafnium
(17) Dichloro[1,1'-dimethylsilylene bis{2-ethyl-4-(3-chloro-4-t-butylphenyl)-4-hydroazulenyl}]hafnium
(18) Dichloro[1,1'-dimethylsilylene bis{2-ethyl-4-(3-methyl-4-trimethylsilylphenyl)-4-hydroazulenyl}]hafnium

(19) Dichloro[1,1'-dimethylgermylene bis{2-methyl-4-(2-fluoro-4-biphenylyl)-4-hydroazulenyl}]hafnium
(20) Dichloro[1,1'-dimethylgermylene bis{2-methyl-4-(4-t-butylphenyl)-4-hydroazulenyl}]hafnium
(21) Dichloro[1,1'-(9-silafluorene-9,9-diyl)bis{2-ethyl-4-(4-chlorophenyl)-4-hydroazulenyl}]hafnium
(22) Dichloro[1,1'-dimethylsilylene bis{2-ethyl-4-(4-chloro-2-naphthyl)-4-hydroazulenyl}]hafnium
(23) Dichloro[1,1'-dimethylsilylene bis{2-ethyl-4-(2-fluoro-4-biphenylyl)-4-hydroazulenyl}]hafnium
(24) Dichloro[1,1'-(9-silafluorene-9,9-diyl)bis{2-ethyl-4-(3,5-dichloro-4-trimethylsilylphenyl)-4-hydroazulenyl}]hafnium Of them, preferred are the following compounds.
(2) Dichloro[1,1'-dimethylsilylene bis{2-methyl-4-(4-chlorophenyl)-4-hydroazulenyl}]hafnium
(7) Dichloro[1,1'-dimethylsilylene bis{2-methyl-4-(3-chloro-4-trimethylsilylphenyl)-4-hydroazulenyl}]hafnium
(23) Dichloro[1,1'-dimethylsilylene bis{2-ethyl-4-(2-fluoro-4-biphenylyl)-4-hydroazulenyl}]hafnium
(22) Dichloro[1,1'-dimethylsilylene bis{2-ethyl-4-(4-chloro-2-naphthyl)-4-hydroazulenyl}]hafnium
(18) Dichloro[1,1'-dimethylsilylene bis{2-ethyl-4-(3-methyl-4-trimethylsilylphenyl)-4-hydroazulenyl}]hafnium
(24) Dichloro[1,1'-(9-silafluorene-9,9-diyl)bis{2-ethyl-4-(3,5-dichloro-4-trimethylsilylphenyl)-4-hydroazulenyl}]hafnium Of them, still more preferred are the following compounds.
(2) Dichloro[1,1'-dimethylsilylene bis{2-methyl-4-(4-chlorophenyl)-4-hydroazulenyl}]hafnium
(23) Dichloro[1,1'-dimethylsilylene bis{2-ethyl-4-(2-fluoro-4-biphenylyl)-4-hydroazulenyl}]hafnium
(18) Dichloro[1,1'-dimethylsilylene bis{2-ethyl-4-(3-methyl-4-trimethylsilylphenyl)-4-hydroazulenyl}]hafnium
(24) Dichloro[1,1'-(9-silafluorene-9,9-diyl)bis{2-ethyl-4-(3,5-dichloro-4-trimethylsilylphenyl)-4-hydroazulenyl}]hafnium II-1-3. Component [B]

The component [B] is a compound or layered silicate which is reactive with the components [A-1] and [A-2] to form an ion pair.

The component [B] may be used alone, or two or more kinds of the components [B] may be used. The component [B] is preferably the layered silicate.

II-1-3-1. Compound which is Reactive with the Components [A-1] and [A-2] to Form an Ion Pair As the compound which is reactive with the components [A-1] and [A-2] to form an ion pair, examples include, but are not limited to, an aluminum oxy compound and a boron compound. As the aluminum oxy compound, examples include, but are not limited to, compounds represented by the following general formulae (I) to (III).

General Formula (I)

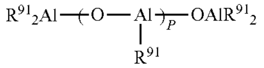

General Formula (II)

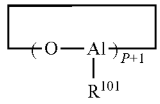

-continued

General Formula (III)

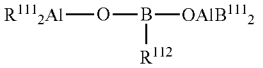

In the general formula (I), (II), and (III), $R^{91}$, $R^{101}$ and Rill each independently represents a hydrogen atom or a hydrocarbon group, preferably a C1-C10 hydrocarbon group, and particularly preferably a C1-C6 hydrocarbon group. A number of $R^{91}$'s may be the same or different; a number of $R^{101}$'s may be the same or different; and a number of $R^{111}$'s may be the same or different. Also, p is an integer of from 0 to 40, and preferably an integer of from 2 to 30.

Each of the compounds represented by the general formulae (I) and (II) is a compound called aluminoxane. Among aluminoxanes, methylaluminoxane or methyl isobutyl aluminoxane is preferred. Several kinds of aluminoxanes may be used in each group or between the groups.

In the general formula (III), $R^{112}$ is a C1-C10 (preferably C1-C6) hydrocarbon group.

As the boron compound, examples include, but are not limited to, a complex of a cation (such as carbonium cation and ammonium cation) and an organoboron compound (such as triphenylboron, tris(3,5-difluorophenyl)boron and tris(pentafluorophenyl)boron), and various kinds of organoboron compounds such as tris(pentafluorophenyl)boron.

II-1-3-2. Layered Silicate

The layered silicate (hereinafter, it may be simply referred to as "silicate") is a silicate compound having a crystal structure such that sheet-shaped crystals are stacked in parallel by ionic bonding or the like. In the silicate compound, the sheet-shaped crystals form single layers, and interlayer ions may be present between the layers.

As the layered silicate, examples include, but are not limited to, layered silicates described in "Nendo Kobutsu Gaku (Clay mineralogy)" written by Haruo Shirozu (published by Asakura Shoten in 1988), such as a layered silicate having a 1:1 layer structure, which consists of a unit made up of one tetrahedral sheet and one octahedral sheet, and a layered silicate having a 2:1 layer structure, which consists of a unit made up of two tetrahedral sheets and one octahedral sheet sandwiched therebetween.

As the layered silicate having the 1:1 layer structure, examples include, but are not limited to, kaolin group silicates (such as dickite, nacrite, kaolinite, metahalloysite and halloysite) and serpentine group silicates (such as chrysotile, lizardite and antigorite).

As the layered silicate having the 2:1 layer structure, examples include, but are not limited to, smectite group silicates (such as montmorillonite, beidellite, nontronite, saponite, hectorite and stevensite), vermiculite group silicates (such as vermiculite), mica group silicates (such as mica, illite, sericite and glauconite), attapulgite, sepiolite, palygorskite, bentonite, pyrophyllite, talc and a chlorite group. They may form a mixed layer.

Among them, preferred is a layered silicate which has, as the main component, a 2:1 layer structure consisting of a unit made up of two tetrahedral sheets and one octahedral sheet sandwiched therebetween, the tetrahedral sheets mainly consisting of silicon oxide and the octahedral sheet mainly consisting of aluminum oxide. The main component is preferably a smectite group silicate, and more preferably montmorillonite.

The layered silicate can contain exchangeable ions (interlayer ions) between the layers. Such a layered silicate that can exchange interlayer ions, is an ion-exchange layered silicate.

The interlayer ion is preferably an interlayer cation such that the ion is a cation. The type of the interlayer cation is not particularly limited. As the main component, examples include, but are not limited to, an alkali metal of the Group 1 in the periodic table, such as lithium and sodium, an alkali-earth metal of the Group 2 in the periodic table, such as calcium and magnesium, and a transition metal such as iron, cobalt, copper, nickel, zinc, ruthenium, rhodium, palladium, silver, iridium, platinum and gold.

The layered silicate may be a natural layered silicate or an artificially synthesized layered silicate.

The form of the layered silicate is not particularly limited. The layered silicate may be in a naturally mined form, or it may be in an artificially synthesized spherical form.

The form of the naturally mined layered silicate can be processed by an operation such as pulverization and granulation. The form of the naturally mined layered silicate is preferably made into a spherical form by granulation. The particle size distribution of the layered silicate processed into a spherical form, is particularly preferably narrowed by an operation such as classification, since good polymer particle properties are obtained.

To change the interlayer ions of the layered silicate into alkali metal ions, it is preferable that the layered silicate is chemically treated.

The layered silicate can be chemically treated by the method described in paragraphs 0048 to 0066 in JP-A No. 2018-162391, for example.

The component [B] preferably used in the present invention is a chemically treated layered silicate. From the viewpoint of the amounts and distribution of the supported catalyst components [A-1] and [A-2], the Al/Si atomic ratio preferably ranges from 0.01 to 0.25, more preferably from 0.03 to 0.24, and still more preferably from 0.05 to 0.23.

In reference to the description of paragraph 0089 in JP-A No. 2018-162391, the aluminum and silicon in the layered silicate are measured by the method for creating a calibration curve by the chemical analysis method defined in JIS and quantifying the aluminum and silicon by X-ray fluorescence.

II-1-4. Component [C]

The component [C] used in the present invention is an organoaluminum compound, and it is preferably an organoaluminum compound represented by the following general formula (4):

$$(AlR_nX_{3-n})_m \qquad \text{General Formula (IV)}$$

(where R is a C1-C20 alkyl group; X is halogen, hydrogen, an alkoxy group or an amino group; n is an integer of from 1 to 3; and m is an integer of from 1 to 2.)

As the component [C], an organoaluminum compound can be used solely, or several kinds of organoaluminum compounds can be used in combination of two or more.

As the organoaluminum compound, examples include, but are not limited to, trimethylaluminum, triethylaluminum, tri-n-propylaluminum, tri-n-butylaluminum, triisobutylaluminum, tri-n-hexylaluminum, tri-n-octylaluminum, tri-n-decylaluminum, diethylaluminum chloride, diethylaluminum sesquichloride, diethylaluminum hydride, diethylaluminum ethoxide, diethylaluminum dimethylamide, diisobutylaluminum hydride, and diisobutylaluminum chloride. Of them, preferred is a trialkylaluminum (represented by the general formula (IV) where m is 1 and n is 3) and a dialkylaluminum hydride (represented by the general formula (IV) where m is 2; n is 1; and X is hydrogen). More preferred is a trialkylaluminum (represented by the general formula (IV) where R is C1 to C8).

II-1-5. Catalyst preparation

The olefin polymerization catalyst preferably used in the present invention contains the above-described components [A-1], [A-2], [B] and [C]. The olefin polymerization catalyst can be obtained by contacting them inside or outside a polymerization tank. The olefin polymerization catalyst may be preliminarily polymerized in the presence of an olefin.

The amounts of the components [A-1], [A-2], [B] and [C] used can be any amounts.

For example, the total amount of the components [A-1] and [A-2] used is preferably in a range of from 0.1 μmol to 1000 μmol, and more preferably from 0.5 μmol to 500 μmol, with respect to 1 g of the component [B].

As for the ratio between the components [A-1] and [A-2], the ratio of the molar amount of the component [A-1] to the total molar amount of the components [A-1] and [A-2] is preferably 0.30 or more and 0.99 or less. By appropriately changing this ratio, in addition to the average molecular weight, the high molecular weight and the very high molecular weight, the branch number and the branch distribution are changed. Accordingly, the branched propylene-based polymer of the present invention in which, while maintaining the necessary branched structure, there are less components having an extraordinarily long relaxation time, is obtained.

The amount of the component [C] used is, in terms of the molar ratio of the aluminum of the component [C] to the total transition metals of the components [A-1] and [A-2], preferably in a range of from 0.01 to $5\times10^6$, and more preferably from 0.1 to $1\times10^4$.

The components [A-1], [A-2], [B] and [C] can be brought into contact in any order. As the order, examples include the following.

One of the components [A-1] and [A-2] is brought into contact with the component [B]; they are brought into contact with the component [C]; and then they are brought into contact with the remaining component [A-1] or [A-2].

The components [A-1] and [A-2] are separately or concurrently brought into contact with the component [B], and then they are brought into contact with the component [C].

The components [C] and [B] are brought into contact with each other, and then the components [A-1] and [A-2] are successively or concurrently brought into contact with them.

Of them, it is particularly preferable to bring the components [A-1] and [A-2] into contact with the component [C], in the presence of the component [B].

In the above examples, a solvent may be used for sufficient contact between the components. As the solvent, examples include, but are not limited to, aliphatic saturated hydrocarbon, aromatic hydrocarbon, aliphatic unsaturated hydrocarbon, halides thereof, and a monomer for preliminarily polymerization. As the aliphatic saturated hydrocarbon and the aromatic hydrocarbon, examples include, but are not limited to, hexane, heptane and toluene. As the monomer for preliminarily polymerization used as the solvent, examples include, but are not limited to, propylene.

II-1-6. Preliminary Polymerization

The olefin polymerization catalyst is preferably subjected to preliminary polymerization in which, by bringing the catalyst into contact with an olefin, a small amount of the olefin is polymerized. By the preliminary polymerization, the catalytic activity is improved, and the manufacturing cost of the propylene-based polymer is reduced.

The olefin used is not particularly limited. As the olefin, examples include, but are not limited to, ethylene, propylene, 1-butene, 1-hexene, 1-octene, 4-methyl-1-pentene, 3-methyl-1-butene, vinylcycloalkane and styrene. Of them, propylene is preferred.

The olefin can be fed into a preliminary polymerization tank by any method. As the method, examples include, but are not limited to, a method for introducing the olefin at a fixed rate, a method for introducing the olefin while keeping the olefin at a fixed pressure, combinations thereof, and a method for changing the feeding method of the olefin in a stepwise manner.

The preliminary polymerization temperature and the preliminary polymerization time are not particularly limited, and they are preferably in a range of from −20° C. to 100° C. and a range of from 5 minutes to 24 hours, respectively.

As the preliminary polymerization ratio, the mass ratio of the preliminarily polymerized polymer to the component [B] is preferably from 0.01 to 100, and more preferably from 0.1 to 50.

During the preliminary polymerization, the component [C] can be added.

During or after the preliminary polymerization, a polymer such as polyethylene and polypropylene or a solid inorganic oxide such as silica and titania may be allowed to coexist.

II-2. Method for Polymerizing the Propylene-Based Polymer

As the method for polymerizing the branched propylene-based polymer of the present invention, examples include, but are not limited to, a method for homopolymerizing propylene or copolymerizing propylene with a comonomer in the presence of the propylene polymerization catalyst comprising the components [A-1], [A-2], [B] and [C].

As the polymerization styles, any method such as a solution polymerization method, a gas phase polymerization method, a bulk polymerization method in which propylene is used as a solvent instead of substantially using an inert solvent, can be employed. Of them, the bulk polymerization method is preferred.

For example, the polymerization temperature of the bulk polymerization is preferably 40° C. or more and 80° C. or less, and more preferably 50° C. or more and 75° C. or less. The polymerization pressure of the bulk polymerization is preferably 1.0 MPa or more and 5.0 MPa or less, more preferably 1.5 MPa or more and 4.0 MPa or less, still more preferably 2.0 MPa or more and 3.5 MPa or less.

As the polymerization method, a continuous polymerization method or a batch polymerization method can be employed.

As the number of polymerization stages, a single-stage polymerization or a multi-stage polymerization of two or more stages can be employed.

The polymerization may be homopolymerization of propylene, or it may be copolymerization of propylene and a C2 to C20 α-olefin comonomer other than propylene, such as at least one kind of comonomer selected from ethylene, 1-butene, 1-hexene, 1-octene and 4-methyl-1-pentene. By the homopolymerization of propylene, a propylene homopolymer is obtained. By the copolymerization of propylene and a comonomer, a propylene copolymer is obtained.

[Use of Hydrogen]

The branched propylene-based polymer of the present invention is preferably obtained by controlling the use of hydrogen in the presence of the catalyst.

For example, when the amount of hydrogen used is small, the molecular weight of the propylene-based polymer produced from the component [A-2] increases, and the molecular weight distribution extends to the high molecular weight side. Accordingly, Mz, Mz/Mw, $W100\times10^4$ and $W200\times10^4$ increase. In a synergistic manner, as for propylene polymerization activity, since the component [A-1] is largely activated by hydrogen relative to the component [A-2], the activation of the component [A-1] become insufficient as the hydrogen decreases; the proportion of the propylene-based polymer produced from the component [A-2] becomes relatively large; and the values of $W100\times10^4$ and $W200\times10^4$ further increase.

When the high-molecular-weight region components which have the branched structures and which are represented by Mz, $W100\times10^4$ and $W200\times10^4$ increase too much, there are too many components having an extraordinarily long relaxation time. Accordingly, SHI@1 becomes large; the difference between the strain rates of the strain hardening indices, i.e., [SHI@10-SHI@1] becomes small; and stability when the melted resin flows, is impaired.

On the other hand, when the amount of hydrogen used is large, the component [A-2] is more susceptible to a decrease in the molecular weight by the hydrogen than the component [A-1]; the average molecular weight of the propylene-based polymer produced from the component [A-2] decreases to be closer to the average molecular weight of the propylene-based polymer produced from the component [A-1]; the molecular weight distribution is narrowed; and Mz/Mw, Mw/Mn and Mz values decrease. Since the component [A-1] is relatively more activated by the hydrogen than the component [A-2], when the amount of hydrogen used is large, the polymer derived from the component [A-2] decreases, and the values of $W100\times10^4$ and $W200\times10^4$ decrease.

When the high-molecular-weight region components which have the branched structures and which are represented by Mz, $W100\times10^4$ and $W200\times10^4$ decrease too much, the components having an extraordinarily long relaxation time decrease too much. Accordingly, not only SHI@1 but also SHI@10 become small, and the necessary melt tension cannot be obtained.

The amount of hydrogen used is an amount that can be increased or decreased by the ratio of the introduced hydrogen amount to the introduced propylene amount, and it is an amount that can be measured as a hydrogen concentration that can be measured by use of a gas chromatograph.

As the hydrogen concentration control method, examples include, but are not limited to, a method for changing the hydrogen concentration with time, in which the hydrogen concentration is initially high by introducing hydrogen only in the initial stage of the batch polymerization and is decreased by consuming the hydrogen in the latter stage thereof; a method for keeping the hydrogen concentration constant by continuously introducing hydrogen in the batch polymerization; and a method for keeping the hydrogen concentration constant by, in the continuous polymerization, keeping constant the ratio between the amount of the introduced propylene and that of the introduced hydrogen per unit time. From the viewpoint of preventing too much increase in the components having an extraordinarily long relaxation time, while retaining a necessary melt tension for molding, it is preferable to homopolymerize propylene or copolymerize propylene with a comonomer by keeping the hydrogen concentration constant so that the hydrogen amount is not increased or decreased too much with time. Preferred is a method for homopolymerizing propylene or copolymerizing propylene with a comonomer by keeping the hydrogen concentration constant by, in the continuous polymerization in which hydrogen and propylene are continuously introduced into the polymerization reactor, keeping constant the ratio between the amount of the introduced propylene and that of the introduced hydrogen per unit time.

For example, in the bulk polymerization, it is possible to check whether the hydrogen concentration in the polymerization reactor is constant or not, by measuring the hydrogen concentration of a gas phase part at regular time intervals.

To obtain the branched propylene-based polymer of the present invention by the bulk polymerization, it is preferable to keep the average hydrogen concentration value of the gas phase part constant so that the variation coefficient is 0.02 or less in a range of 200 volppm or more and 1000 volppm or less, and it is more preferable to keep the average hydrogen concentration value of the gas phase part constant so that the variation coefficient is 0.02 or less in a range of from 400 volppm to 600 volppm.

[Method for Using the Catalyst]

In the case of continuously polymerizing the branched propylene-based polymer of the present invention, it is preferable to continuously introduce the catalyst when at least hydrogen and propylene are continuously introduced into the polymerization reactor.

[Polymer Slurry Concentration]

For example, in the case of producing the branched propylene-based polymer of the present invention by bulk continuous polymerization, the amount of the polymer contained in the polymerization reactor can be kept constant (a steady state) by controlling the amount of the propylene introduced into the polymerization reactor and the recovered amounts of the produced polymer and the unreacted propylene.

At this time, the ratio of the polymer amount to the propylene mass in the polymerization reactor (i.e., a polymer slurry concentration) is constant.

However, even when the polymer slurry concentration is constant, when the polymer is slightly precipitated, the polymer concentration varies depending on the height of the position in the propylene solution. In this case, the hydrogen consumption rate varies depending on the position, resulting in broadening of the molecular weight and branch distribution.

Accordingly, in the method for producing the branched propylene-based polymer of the present invention, the polymer slurry concentration is preferably 55 mass % or less, more preferably 50 mass % or less, and still more preferably 45 mass % or less.

From the viewpoint of productivity, it is preferable to control the polymer slurry concentration. In the method for producing the branched propylene-based polymer of the present invention, the polymer slurry concentration is preferably 30 mass % or more, more preferably 35 mass % or more, and still more preferably 40 mass % or more.

III. Applications of the Branched Propylene-Based Polymer

The branched propylene-based polymer of the present invention can be used as a molding material after it is made into the form of a powder, the form of pellets cut into granules after heat melt-kneading, or the like.

The branched propylene-based polymer of the present invention can be mixed with various kinds of additives such as an antioxidant, an UV absorber, an antistatic agent, a nucleating agent, a lubricant, a flame retardant, an anti-blocking agent, a colorant, an inorganic filler and an organic filler, and various kinds of resins such as a synthetic resin and a natural resin.

The branched propylene-based polymer of the present invention can be molded by any of various kinds of polypropylene molding methods such as injection molding, extrusion molding, foam molding and blow molding. The branched propylene-based polymer of the present invention can be used to produce various kinds of molded products such as an injection-molded industrial component, a container, an unstretched film, a uniaxially stretched film, a biaxially stretched film, a sheet, a pipe and fibers.

In the branched propylene-based polymer of the present invention, while it retains the necessary melt tension, there are less components having an extraordinarily long relaxation time. Accordingly, in extrusion lamination molding, the branched propylene-based polymer of the present invention can be molded at high speed without the occurrence of draw resonance; moreover, a neck-in phenomenon observed at that time is small. Accordingly, the branched propylene-based polymer of the present invention is preferably used to increase the productivity.

Also, the branched propylene-based polymer of the present invention can be blended with other resins when used.

EXAMPLES

Hereinafter, the present invention will be described in more detail, with reference to examples and comparative examples. The present invention is not limited to these examples, unless it is beyond the gist thereof.

The following parameters (1) to (11) were measured and calculated by the methods described in this Description.

(1) The melt flow rate (MFR) measured at a temperature of 230° C. and a load of 2.16 kg (2) Mn, Mw, Mz, Mw/Mn and Mz/Mw which are obtained by GPC (3) W100×$10^4$ and W200×$10^4$ in the integral molecular weight distribution curve obtained by GPC (4) The weight average molecular weight ($Mw_{abs}$) of the absolute molecular weight $M_{abs}$ obtained by 3D-GPC, the branching index g'(100×$10^4$), the branching index g' ($Mw_{abs}$) and [g' ($Mw_{abs}$)−g' (100×$10^4$)]

(5) η*(0.01), η*(100) and [η*(0.01)/η*(100)] in dynamic viscoelasticity measurement (6) The mesotriad fraction (mm) measured by $^{13}$C-NMR, the heterologous bond amount (2,1 bond), and the heterologous bond amount (1,3 bond)

(7) The amount (TREF 40° C.) of the component eluted at a temperature of 40° C. or less in the elution curve obtained by temperature rising elution fractionation (TREF) measurement with o-dichlorobenzene (ODCB)

(8) The melting point (Tm) measured by differential scanning calorimetry (DSC)

(9) The number of the long-chain branches (the LCB number) measured by $^{13}$C-NMR

(10) SHI@10/s and SHI@1.0/s [SHI@10/s-SHI@1.0/s] obtained by elongational viscosity measurement

(11) The melt tension at 190° C. (MT190)

Synthesis Example 1: Preparation of Component [A-1] (Complex 1)

(1) Synthesis of Complex 1

As the component [A-1] (complex 1), rac-dichloro[1,1'-dimethylsilylene bis{2-(5-methyl-2-furyl)-4-(4-i-propylphenyl)indenyl}]hafnium was synthesized by the method described in Synthesis Example 1 in JP-A No. 2012-149160.

(2) Evaluation for Terminal Vinyl Rate (Rv) and Weight Average Molecular Weight (2-1) Preparation of Catalyst (2-a) Chemical Treatment of Layered Silicate First, 645.1 g of distilled water and 82.6 g of 98% sulfuric acid were fed into a 1 L three-necked flask, which was equipped with stirring blades and a reflux device, and the temperature of the mixture was increased to 95° C.

Next, 100 g of a commercially-available montmorillonite (BENCLAY KK manufactured by Mizusawa Industrial Chemicals, Ltd., Al: 9.78 mass %, Si: 31.79 mass %, Mg: 3.18 mass %, Al/Si (atomic ratio): 0.320, average particle diameter: 14 μm) was added thereto, and the mixture was reacted at 95° C. for 320 minutes. After the elapse of 320 minutes, 0.5 L of distilled water was added to stop the reaction. Then, the mixture was subjected to filtration, thereby obtaining 255 g of a solid in cake form.

The solid in cake form was mixed with 1545 g of distilled water and slurried. The temperature of the obtained slurry was increased to 40° C. To the slurry, 5.734 g of a lithium hydroxide-hydrate was added in solid form. Then, the slurry was reacted at 40° C. for one hour. After the elapse of one hour, the reacted slurry was subjected to filtration and then washed three times with 1 L of distilled water, thereby obtaining a solid in cake form again.

The solid in cake form was recovered and dried, thereby obtaining 80 g of a chemically-treated montmorillonite. The chemical composition of the chemically-treated montmorillonite was as follows:

Al: 7.68 mass %
Si: 36.05 mass %
Mg: 2.13 mass %
Al/Si (atomic ratio): 0.222
Li: 0.53 mass %.

(2-b) Preliminary Polymerization

First, 20 g of the chemically-treated montmorillonite obtained above was fed into a 1 L three-necked flask. The chemically-treated montmorillonite was mixed with 131 mL of heptane and slurried. Next, 50 mmol of triisobutylaluminum (69 mL of a heptane solution with a concentration of 143.4 mg/mL) was added thereto, and they were stirred for one hour at room temperature. After the elapse of one hour, a thus-obtained slurry was washed with heptane to 1/100, thereby adjusting the total volume of the slurry to 100 mL.

The temperature of the slurry solution containing the chemically-treated montmorillonite was increased to 50° C. To the slurry solution, 4.2 mmol of tri-n-octylaluminum (10.6 mL of a heptane solution with a concentration of 145.0 mg/mL) was added, and they were stirred at 50° C. for 20 minutes.

To the slurry solution, 0.3 mmol of rac-dichloro[1,1'-dimethylsilylene bis{2-(5-methyl-2-furyl)-4-(4-i-propylphenyl)indenyl}]hafnium (complex 1), which was slurried with 50 mL of toluene, was added. Then, the slurry solution was stirred for 20 minutes, while keeping the temperature at 50° C.

Then, heptane was added so that the total volume of the slurry solution was 500 mL. The thus-obtained slurry was introduced into a 1 L autoclave.

After the internal temperature of the autoclave was controlled to 40° C., preliminary polymerization was carried out, while introducing propylene at a rate of 10 g/hour for 4 hours and keeping the internal temperature at 40° C. Then, the propylene introduction was stopped, and the residual polymerization reaction was carried out for one hour, while keeping the internal temperature at 40° C.

After the supernatant of a catalyst slurry thus obtained was removed therefrom by decantation, the catalyst slurry was mixed with heptane and subjected to decantation again, thereby washing the catalyst slurry. To the residue left after the decantation, 12 mmol of triisobutylaluminum (16.6 mL of a heptane solution with a concentration of 143.4 mg/mL) was added, and they were stirred for 10 minutes. This catalyst slurry was dried under reduced pressure at 40° C. for two hours, thereby obtaining 54.0 g of a preliminary polymerization catalyst. The preliminary polymerization ratio of the catalyst (a value (a mass ratio) obtained by dividing a preliminarily polymerized polymer amount by a chemically-treated montmorillonite amount) was 1.70.

(2-2) Polymerization

A 3 L autoclave was sufficiently dried by introducing nitrogen, while heating the autoclave. Then, the inside of the autoclave was purged with propylene and cooled to room temperature. Next, 2.86 mL of a solution (143.4 mg/mL) of triisobutylaluminum in heptane, 240 mL of hydrogen and 750 g of liquefied propylene were introduced, and then the temperature of the autoclave was increased to 70° C. Then, 100 mg of the preliminary polymerization catalyst, which is a mass excluding the preliminarily polymerized polymer, was fed under pressure to a polymerization tank by high-pressure argon to initiate polymerization. After the temperature was kept at 70° C. for one hour, unreacted propylene was quickly purged to stop the polymerization. Accordingly, about 128 g of a propylene homopolymer having an MFR of 38 was obtained.

(2-3) Terminal Vinyl Rate, Terminal Vinylidene Rate and Weight Average Molecular Weight The terminal vinyl rate, terminal vinylidene rate and weight average molecular weight of the obtained propylene homopolymer were evaluated. As a result, the terminal vinyl rate (Rv) was 0.79; the terminal vinylidene rate (Rvd) was 0.13; and the weight average molecular weight (Mw) was 184209.

The heterologous bond amounts thereof were as follows. The 2,1 bond amount was 0.05 mol %, and the 1,3 bond amount was 0.13 mol %.

Synthesis Example 2: Preparation of Component [A-2] (Complex 2)

(1) Synthesis of Complex 2

As the component [A-2] (complex 2), rac-dichloro[1,1'-dimethylsilylene bis{2-methyl-4-(4-chlorophenyl)-4-hydroazulenyl}]hafnium was synthesized by the method described in Example 7 in JP-A No. H11-240909.

(2) Evaluation for Terminal Vinyl Rate (Rv) and Weight Average Molecular Weight (2-1) Preparation of Catalyst (2-b) Preliminary Polymerization First, 20 g of the chemically-treated montmorillonite obtained above in "(2-a) Chemical treatment of layered silicate" under Evaluation for terminal vinyl rate (Rv) of the component [A-1] (complex 1) was fed into a 1 L three-necked flask. The chemically-treated montmorillonite was mixed with 131 mL of heptane and slurried. Next, 50 mmol of triisobutylaluminum (69 mL of a heptane solution with a concentration of 143.4 mg/mL) was added thereto, and they were stirred for one hour at room temperature. After the elapse of one hour, a thus-obtained slurry was washed with heptane to 1/100, thereby adjusting the total volume of the slurry to 100 mL.

The temperature of the slurry solution containing the chemically-treated montmorillonite was increased to 50° C. To the slurry solution, 4.2 mmol of tri-n-octylaluminum (10.6 mL of a heptane solution with a concentration of 145.0 mg/mL) was added, and they were stirred at 50° C. for 20 minutes.

To the slurry solution, 0.3 mmol of rac-dichloro[1,1'-dimethylsilylene bis{2-methyl-4-(4-chlorophenyl)-4-hydroazulenyl}]hafnium (complex 2), which was slurried with 50 mL of toluene, was added. Then, the slurry solution was stirred for 20 minutes, while keeping the temperature at 50° C.

Then, heptane was added so that the total volume of the slurry solution was 500 mL. The thus-obtained slurry was introduced into a 1 L autoclave.

After the internal temperature of the autoclave was controlled to 40° C., preliminary polymerization was carried out, while introducing propylene at a rate of 10 g/hour for 4 hours and keeping the internal temperature at 40° C. Then, the propylene introduction was stopped, and the residual polymerization reaction was carried out for one hour, while keeping the internal temperature at 40° C.

After the supernatant of a catalyst slurry thus obtained was removed therefrom by decantation, the catalyst slurry was mixed with heptane and subjected to decantation again, thereby washing the catalyst slurry. To the residue left after the decantation, 12 mmol of triisobutylaluminum (16.6 mL of a heptane solution with a concentration of 143.4 mg/mL) was added, and they were stirred for 10 minutes. This catalyst slurry was dried under reduced pressure at 40° C. for two hours, thereby obtaining 62.2 g of a preliminary polymerization catalyst. The preliminary polymerization ratio of the catalyst (a value obtained by dividing a preliminarily polymerized polymer amount by a chemically-treated montmorillonite amount) was 2.11.

(2-2) Polymerization

A 3 L autoclave was sufficiently dried by introducing nitrogen, while heating the autoclave. Then, the inside of the autoclave was purged with propylene and cooled to room temperature. Next, 2.86 mL of a solution (143.4 mg/mL) of triisobutylaluminum in heptane, 240 mL of hydrogen and 750 g of liquefied propylene were introduced, and then the temperature of the autoclave was increased to 70° C. Then, 30 mg of the preliminary polymerization catalyst, which is a mass excluding the preliminarily polymerized polymer, was fed under pressure to a polymerization tank by high-pressure argon to initiate polymerization. After the temperature was kept at 70° C. for one hour, unreacted propylene was quickly purged to stop the polymerization. Accordingly, about 157 g of a propylene homopolymer having an MFR of 1.0 was obtained.

(2-3) Terminal Vinyl Rate, Terminal Vinylidene Rate and Weight Average Molecular Weight The terminal vinyl rate, terminal vinylidene rate and weight average molecular weight of the obtained propylene homopolymer were evaluated. As a result, the terminal vinyl rate (Rv) was 0; the terminal vinylidene rate (Rvd) was 0.60; and the weight average molecular weight (Mw) was 511559.

The heterologous bond amounts thereof were as follows. The 2,1 bond amount was 0.55 mol %, and the 1,3 bond amount was 0.37 mol %.

From the above results, it was revealed that the complex 1 of Synthesis Example 1 can be used as the component [A-1] (the metallocene compound which gives, when the propylene is homopolymerized at 70° C., the propylene homopolymer a-1 having a terminal vinyl rate (Rv) of 0.5 or more) and the complex 2 of Synthesis Example 2 can be used as the component [A-2] (the metallocene compound which gives, when the propylene is homopolymerized at 70° C., the propylene homopolymer a-2 having a larger weight average molecular weight than the propylene homopolymer a-1 and having a terminal vinyl rate (Rv) of less than 0.5).

Preparation Example 1: Preparation of Propylene Polymerization Catalyst

First, 150 kg of the chemically-treated montmorillonite obtained as described in "(2-a) Chemical treatment of layered silicate" of Synthesis Example 1, was fed into a reactor with an inner volume of 1 $m^3$. The chemically-treated montmorillonite was mixed with 2832 L of hexane and slurried. Next, 74.4 kg (375 mol) of triisobutylaluminum was fed into the reactor for 85 minutes, and they were stirred for 60 minutes. Then, a slurry thus obtained was washed with hexane to 1/32, thereby adjusting the total volume of the slurry to 900 L.

The slurry solution containing the chemically-treated montmorillonite was kept at 50° C. To the slurry solution, 0.65 kg of triisobutylaluminum (4.257 kg of a hexane solution with a concentration of 15.3 mass %, 3.28 mol) was added.

After stirring the obtained slurry for 5 minutes, 0.657 kg (0.81 mol) of rac-dichloro[1,1'-dimethylsilylene bis{2-methyl-4-(4-chlorophenyl)-4-hydroazulenyl}]hafnium and 96 L of toluene were added thereto. Then, the slurry solution was kept stirred for 60 minutes.

Then, 9.758 kg (26.61 mol) of tri-n-octylaluminum was added to the obtained slurry, and the slurry was stirred for 6 minutes. Next, 240 L of toluene and 0.064 kg of triisobutylaluminum (9.88 kg of a toluene solution having a concentration of 0.648 mass %, 0.32 mol) were fed into another container equipped with a stirrer, and 1.768 kg (1.89 mol) of rac-dichloro[1,1'-dimethylsilylene bis{2-(5-methyl-2-furyl)-4-(4-i-propylphenyl)indenyl}]hafnium was added thereto, thereby preparing a solution. The solution was fed into the slurry; 100 L of toluene was added thereto; and then the slurry was stirred further for 20 minutes.

Next, 2387 L hexane was added thereto; the internal temperature of the reactor was controlled to 40° C.; and then preliminary polymerization was carried out, while feeding 328.1 kg of propylene for 240 minutes and keeping the internal temperature at 40° C. Then, the propylene feeding was stopped, and the residual polymerization reaction was carried out for 80 minutes, while keeping the internal temperature at 40° C.

After the residual polymerization reaction was completed, stirring was stopped to deposit and settle down the contents. A supernatant thus formed was removed so that the amount of the solution reached 1500 L. Next, 12.7 kg of triisobutylaluminum was added to the solution; 3974 L of hexane was added again; the solution was stirred; and then the contents were deposited and settled down. A supernatant thus formed was removed until the amount of the solution reached 1500 L.

Next, 8.9 kg of triisobutylaluminum (42.9 kg of a hexane solution with a concentration of 20.8 mass %) and 205 L of hexane were added thereto.

Then, the reaction solution was moved to a dryer and dried at 40° C. for 9 hours, thereby obtaining 465 kg of a preliminary polymerization catalyst (a preliminary polymerization catalyst 1). The preliminary polymerization ratio of the catalyst (a value (a mass ratio) obtained by dividing a preliminarily polymerized polymer amount by a chemically-treated montmorillonite amount) was 2.10.

Example 1: Production of Propylene-Based Polymer

The following materials were continuously introduced into a stirring high-pressure reaction container (length/diameter (L/D)=1.2) with an inner volume of 100 $m^3$: liquefied propylene at a flow rate of 20 T/hr, triisobutylaluminum at a flow rate of 80 kg/hr, hydrogen at a flow rate of 0.180 kg/hr, and the preliminary polymerization catalyst 1 at a flow rate of 0.87 kg/hr (the mass excluding the preliminarily polymerized polymer). While keeping the temperature of the reaction container at 70±0.1° C., continuous polymerization was carried out so that the concentration of the polymer slurry in the polymerization reactor was kept at 40 mass %. The amount of the produced propylene-based polymer (powder) was 8.0 T/hr. At this time, the average of the ratio of the amount of the introduced hydrogen to that of the introduced propylene was 9.0 mass ppm; the standard deviation was 0.050 mass ppm or less; the variation coefficient was 0.010 or less; and the hydrogen concentration of the gas phase part in the polymerization tank was 450±5 ppm.

After the obtained propylene-based polymer (powder) was sufficiently dried, the MFR, GPC, 3D-GPC, NMR and TREF were measured by use of the powder. A sample piece was produced by pressing the powder and measured by DSC.

The powder was granulated under the following granulation condition to obtain the pellets of the propylene-based polymer. Using the obtained pellets, the melt tension, dynamic viscoelasticity, elongational viscosity and the like were measured. The evaluation results are shown in Table 1.

(Granulation)

With respect to 100 parts by mass of the propylene-based polymer (powder), 0.125 parts by mass of tetrakis[methylene-3-(3',5'-di-t-butyl-4'-hydroxyphenyl)propionate]methane (product name: IRGANOX 1010, a phenol-based antioxidant manufactured by BASF Japan Ltd.) and 0.125 parts by mass of tris(2,4-di-t-butylphenyl)phosphite (product name: IRGAFOS 168, a phosphite-based antioxidant manufactured by BASF Japan Ltd.) were used. They were mixed for three minutes at room temperature, by use of a high-speed agitation mixer (product name: HENSCHEL MIXER). Then, the mixture was melt-kneaded by use of a twin screw extruder, thereby obtaining the pellets of the propylene-based polymer. As the twin screw extruder, KZW-25 (product name, manufactured by Technovel Corporation) was used. The screw rotation frequency of the extruder was set to 400 RPM, and the kneading temperature under the hopper was set as follows in stages: 80° C., 160° C., 210° C. and 230° C. (this temperature was maintained to the outlet of the die).

Example 2: Production of Propylene-Based Polymer

In the polymerization of the propylene-based polymer of Example 1, the introduced hydrogen amount was changed from 0.180 kg/hr to 0.230 kg/hr; the catalyst amount was changed from 0.87 kg/hr to 0.73 kg/hr; the polymer slurry concentration in the polymerization reactor was kept at 40 mass %; and the amount of the propylene-based polymer (powder) extracted from the polymerization reactor was kept at 8.0 T/hr. At this time, the average of the ratio of the amount of the continuously introduced hydrogen to that of the continuously introduced propylene was 11.5 mass ppm; the standard deviation was 0.050 mass ppm or less; the variation coefficient was 0.005 or less; and the hydrogen concentration of the gas phase part in the polymerization tank was 600±5 ppm.

After the obtained propylene-based polymer (powder) was sufficiently dried, the MFR, GPC, 3D-GPC, NMR and TREF were measured by use of the powder. A sample piece was produced by pressing the powder and measured by DSC.

The powder was granulated under the same condition as Example 1 to obtain the pellets of the propylene-based polymer. Using the obtained pellets, the melt tension, dynamic viscoelasticity, elongational viscosity and the like were measured. The evaluation results are shown in Table 1.

Comparative Example 1: Production of Propylene-Based Polymer

A 20 L autoclave was sufficiently dried by introducing nitrogen, while heating the autoclave. Then, the inside of the autoclave was purged with propylene and cooled to room temperature. Next, 18.7 mL of a solution (140 mg/mL) of triisobutylaluminum in heptane and 0.083 g of hydrogen were introduced, followed by 5000 g of liquefied propylene. Next, the temperature of the autoclave was increased to 63° C. Then, 200 mg of the preliminary polymerization catalyst 1, which is a mass excluding the preliminarily polymerized polymer, was fed under pressure to a polymerization tank by high-pressure argon to initiate polymerization, and the temperature was quickly increased to 70° C. The temperature was kept at 70° C., and after the elapse of one hour from the polymerization initiation, unreacted propylene was quickly purged to stop the polymerization. Accordingly, about 2039 g of a propylene-based polymer was obtained.

After the obtained propylene-based polymer (powder) was sufficiently dried, the MFR, GPC, 3D-GPC, NMR and TREF were measured by use of the powder. A sample piece was produced by pressing the powder and measured by DSC.

The powder was granulated under the same condition as Example 1 to obtain the pellets of the propylene-based polymer. Using the obtained pellets, the melt tension, dynamic viscoelasticity, elongational viscosity and the like were measured. The evaluation results are shown in Table 1.

Comparative Example 2: Production of Propylene-Based Polymer

Polymerization was carried out in the same manner as Comparative Example 1, except that 0.099 g of hydrogen was introduced. As a result, about 2058 g of a propylene-based polymer was obtained.

After the obtained propylene-based polymer (powder) was sufficiently dried, the MFR, GPC, 3D-GPC, NMR and TREF were measured by use of the powder. A sample piece was produced by pressing the powder and measured by DSC.

The powder was granulated under the same condition as Example 1 to obtain the pellets of the propylene-based polymer. Using the obtained pellets, the melt tension, dynamic viscoelasticity, elongational viscosity and the like were measured. The evaluation results are shown in Table 1.

Comparative Example 3: Production of Propylene-Based Polymer

Polymerization was carried out in the same manner as Comparative Example 1, except that 0.106 g of hydrogen was introduced. As a result, about 2278 g of a propylene-based polymer was obtained.

After the obtained propylene-based polymer (powder) was sufficiently dried, the MFR, GPC, 3D-GPC, NMR and TREF were measured by use of the powder. A sample piece was produced by pressing the powder and measured by DSC.

The powder was granulated under the same condition as Example 1 to obtain the pellets of the propylene-based polymer. Using the obtained pellets, the melt tension, dynamic viscoelasticity, elongational viscosity and the like were measured. The evaluation results are shown in Table 1.

Comparative Example 4: Production of Propylene-Based Polymer

Polymerization was carried out in the same manner as Comparative Example 1, except that 0.084 g of hydrogen and 320 g of ethylene were introduced, and the amount of the preliminary polymerization catalyst 1 was changed to 70 mg, which is the mass excluding the preliminarily polymerized polymer. As a result, about 2260 g of a propylene-based polymer was obtained.

After the obtained propylene-based polymer (powder) was sufficiently dried, the MFR, GPC, 3D-GPC, NMR and TREF were measured by use of the powder. A sample piece was produced by pressing the powder, and it was measured for the ethylene content by use of IR based on a preliminarily created calibration curve. As a result, the ethylene content was 3.6 wt. %. The sample piece was also measured by DSC.

The powder was granulated under the same condition as Example 1 to obtain the pellets of the propylene-based polymer. Using the obtained pellets, the melt tension, dynamic viscoelasticity, elongational viscosity and the like were measured. The evaluation results are shown in Table 1.

Comparative Example 5: Production of Propylene-Based Polymer

Polymerization was carried out in the same manner as Comparative Example 1, except that 0.091 g of hydrogen and 107 g of ethylene were introduced, and the amount of the preliminary polymerization catalyst 1 was changed to 120 mg, which is the mass excluding the preliminarily polymerized polymer. As a result, about 2413 g of a propylene-based polymer was obtained.

After the obtained propylene-based polymer (powder) was sufficiently dried, the MFR, GPC, 3D-GPC, NMR and TREF were measured by use of the powder. A sample piece was produced by pressing the powder, and it was measured for the ethylene content by use of IR based on a preliminarily created calibration curve. As a result, the ethylene content was 1.0 wt. %. The sample piece was also measured by DSC.

The powder was granulated under the same condition as Example 1 to obtain the pellets of the propylene-based polymer. Using the obtained pellets, the melt tension, dynamic viscoelasticity, elongational viscosity and the like were measured. The evaluation results are shown in Table 1.

TABLE 1

| | | Example 1 | Example 2 |
|---|---|---|---|
| MFR | g/min | 33 | 55 |
| Mn | g/mol | 53249 | 51227 |
| Mw | g/mol | 175721 | 163925 |
| Mz | g/mol | 627064 | 653405 |
| Mw/Mn | — | 3.3 | 3.2 |
| Mz/Mw | — | 3.6 | 4.0 |
| W100 × $10^4$ | wt % | 2.3 | 1.9 |
| W200 × $10^4$ | wt % | 1.0 | 0.3 |
| Mwabs | g/mol | 224336 | 211437 |
| g'(Mwabs) | — | 0.83 | 0.82 |
| g'(100 × $10^4$) | — | 0.78 | 0.75 |
| g'(Mwabs) − g'(100 × $10^4$) | — | 0.05 | 0.07 |
| η*(0.01) | Pa · s | 2034 | 1066 |
| η*(100) | Pa · s | 231 | 185 |
| η*(0.01)/η*(100) | — | 8.8 | 5.8 |
| Right-hand value of Formula (1) | | 13.1 | 8.5 |
| Conformance to Formula (1) | | Present | Present |
| Right-hand value of Formula (2) | | 6.1 | 1.5 |
| Conformance to Formula (2) | | Present | Present |
| mm | % | 98.4 | 98.4 |
| [2,1] Bond | mol % | 0.22 | 0.22 |
| [1,3] Bond | mol % | 0.26 | 0.26 |
| TREF 40° C. | wt % | 0.6 | 0.5 |
| Tm | ° C. | 154.6 | 154.7 |
| LCB number | /1000P | 0.1 | 0.1 |
| MT190 | g | 2.2 | 0.9 |
| SHI10/s | — | 1.25 | 1.20 |

TABLE 1-continued

| | | | |
|---|---|---|---|
| SHI1.0/s | — | 1.09 | 1.01 |
| SHI10/s − SHI1.0/s | — | 0.16 | 0.19 |

| | | Comparative Example 1 | Comparative Example 2 | Comparative Example 3 | Comparative Example 4 | Comparative Example 5 |
|---|---|---|---|---|---|---|
| MFR | g/min | 22 | 40 | 50 | 30 | 60 |
| Mn | g/mol | 56517 | 48129 | 47541 | 61689 | 59885 |
| Mw | g/mol | 226635 | 187702 | 174474 | 185066 | 167677 |
| Mz | g/mol | 1090590 | 1032361 | 1027924 | 552162 | 491769 |
| Mw/Mn | — | 4.0 | 3.9 | 3.7 | 3.0 | 2.8 |
| Mz/Mw | — | 4.8 | 5.5 | 5.9 | 3.0 | 2.9 |
| W100 × $10^4$ | wt % | 4.0 | 2.7 | 2.3 | 4.6 | 1.4 |
| W200 × $10^4$ | wt % | 2.3 | 0.9 | 0.6 | 0.5 | 0.4 |
| Mwabs | g/mol | 281459 | 231236 | 214171 | 228036 | 205590 |
| g'(Mwabs) | — | 0.88 | 0.89 | 0.91 | 0.98 | 0.95 |
| g'(100 × $10^4$) | — | 0.78 | 0.77 | 0.77 | 0.95 | 0.90 |
| g'(Mwabs) − g'(100 × $10^4$) | — | 0.10 | 0.12 | 0.14 | 0.03 | 0.05 |
| η*(0.01) | Pa · s | 5237 | 2520 | 1862 | 1500 | 900 |
| η*(100) | Pa · s | 257 | 210 | 190 | 230 | 170 |
| η*(0.01)/η*(100) | — | 20.4 | 12.0 | 9.8 | 6.5 | 5.3 |
| Right-hand value of Formula (1) | | 16.9 | 11.4 | 9.3 | 14.0 | 7.7 |
| Conformance to Formula (1) | | Absent | Absent | Absent | Present | Present |
| Right-hand value of Formula (2) | | 9.9 | 4.4 | 2.3 | 0.0 | 0.7 |
| Conformance to Formula (2) | | Present | Present | Present | Absent | Present |
| mm | % | 98.4 | 98.4 | 98.4 | 98.0 | 98.1 |
| [2,1] Bond | mol % | 0.22 | 0.22 | 0.21 | — | — |
| [1,3] Bond | mol % | 0.26 | 0.26 | 0.26 | — | — |
| TREF 40° C. | wt % | 1.1 | 0.8 | 0.7 | 1.1 | 1.2 |
| Tm | ° C. | 154.6 | 154.6 | 154.7 | 125.2 | 145.2 |
| LCB number | /1000P | 0.1 | 0.1 | 0.1 | <0.1 | <0.1 |
| MT190 | g | 3.0 | 1.6 | 1.3 | 0.3 | 0.3 |
| SHI10/s | — | 1.35 | 1.18 | 1.14 | 0.20 | 0.20 |
| SHI1.0/s | — | 1.30 | 1.14 | 1.12 | 0.15 | 0.15 |
| SHI10/s − SHI1.0/s | — | 0.05 | 0.04 | 0.02 | 0.05 | 0.05 |

Figure 3:
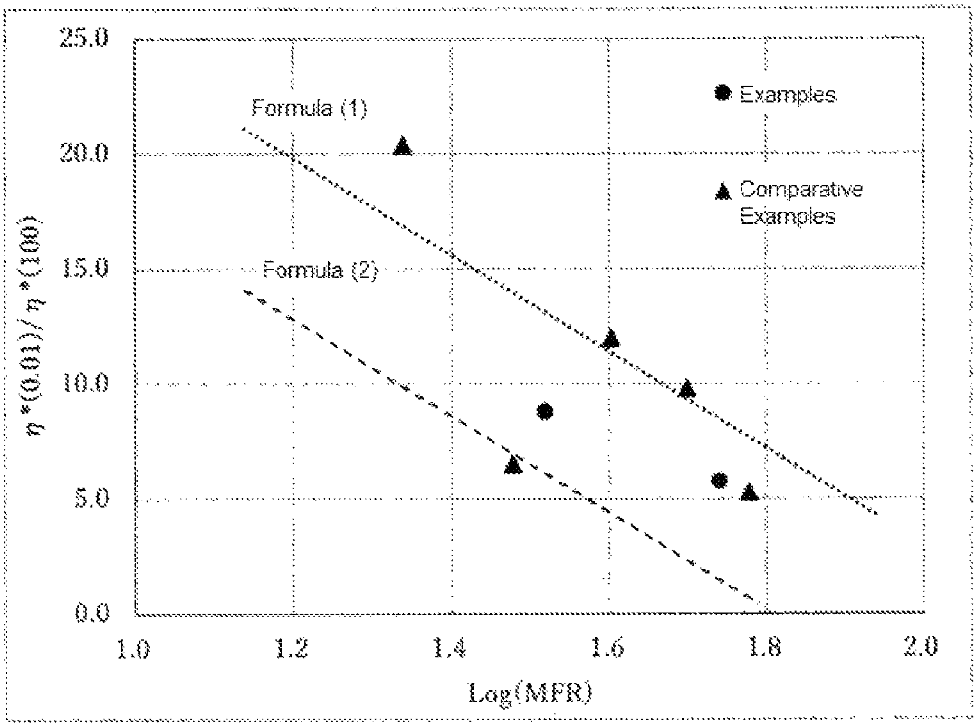
FIG. 3 is a view showing the relationship between, for the propylene-based polymers of Examples 1 and 2 and Comparative Examples 1 to 5, the MFR (unit: g/10 min) and the ratio [η*(0.01 rad/s)/η*(100 rad/s)] between the low frequency-side complex viscosity and the high frequency-side complex viscosity.

FIG. 3 shows the relationship between the angular frequency ω dependence of the complex viscosity η*(ω) and the MFR.

Examples 1 and 2 and Comparative Examples 1 to 5 revealed the following. Since the branched propylene-based polymer of the present invention has branched propylene structures different from the prior art, especially molecular weight distribution and branch distribution, and since the angular frequency ω dependence of the complex viscosity η*(ω) in the dynamic viscoelasticity measurement and the MFR satisfy the specific formulae, the components having an extraordinarily long relaxation time decrease; moreover, the branched propylene-based polymer shows small strain hardening in the low deformation rate range while retaining a necessary melt tension for molding, and it shows a large difference between the strain hardening in the low deformation rate range and the strain hardening in the high deformation rate range.

The invention claimed is:

1. A branched propylene-based polymer having the following properties (1) to (5):

property (1): a melt flow rate (MFR) measured at a temperature of 230° C. and a load of 2.16 kg is 10 g/10 min or more and 100 g/10 min or less;

property (2): a ratio (Mw/Mn) between a weight average molecular weight (Mw) and a number average molecular weight (Mn), both of which are obtained by gel permeation chromatography (GPC), is 2.5 or more and less than 3.5; a ratio (Mz/Mw) between a z average molecular weight (Mz) and a weight average molecular weight (Mw), both of which are obtained by GPC, is 3.0 or more and 4.7 or less; and the z average molecular weight (Mz) is $50.0\times10^4$ or more and $94.0\times10^4$ or less;

property (3): in an integral molecular weight distribution curve obtained by GPC, a percentage ($W100\times10^4$) of a component having a molecular weight of $100\times10^4$ or more, is 1.5 mass % or more and 4.0 mass % or less;

property (4): in a molecular weight distribution curve obtained by 3D-GPC, a branching index g'($100\times10^4$) at an absolute molecular weight $M_{abs}$ of $100\times10^4$ is more than 0.70 and 0.85 or less; and property (5): a ratio [η*(0.01)/η*(100)] between a complex viscosity η*(0.01) at an angular frequency ω of 0.01 rad/s (ω=0.01 rad/s) and a complex viscosity η*(100) at an angular frequency @ of 100 rad/s (ω=100 rad/s) in dynamic viscoelasticity measurement, is 4.0 or more and 20 or less, and η*(0.01)/η*(100) and the MFR satisfy the following formulae (1) and (2):

$$\eta^*(0.01)/\eta^*(100)\leq-21\times\mathrm{Log}(\mathrm{MFR})+45 \quad \text{Formula (1)}$$

$$\eta^*(0.01)/\eta^*(100)\geq-21\times\mathrm{Log}(\mathrm{MFR})+38 \quad \text{Formula (2).}$$

2. The branched propylene-based polymer according to claim 1, further having the following property (4'):

property (4'): a weight average molecular weight ($MW_{abs}$) of the absolute molecular weight obtained by 3D-GPC is less than $100\times10^4$, and in the molecular weight distribution curve obtained by 3D-GPC, a branching index g' ($MW_{abs}$) at the weight average molecular weight $MW_{abs}$ of the absolute molecular weight and the branching index g'($100\times10^4$) satisfy the following formula (3):

$$0\leq g'(MW_{abs})-g'(100\times10^4)\leq0.10 \quad \text{Formula (3).}$$

3. The branched propylene-based polymer according to claim 1, further having the following property (6):

property (6): a mesotriad fraction (mm) measured by 13C-NMR, is 95% or more and less than 99%; a heterologous bond amount (2,1 bond) is 0.05 mol % or more and 0.50 mol % or less; and a heterologous bond amount (1,3 bond) is 0.05 mol % or more and 0.50 mol % or less.

4. The branched propylene-based polymer according to claim 1, further having the following property (7):

property (7): in an elution curve obtained by temperature rising elution fractionation (TREF) measurement with o-dichlorobenzene (ODCB), a component eluted at a temperature of 40° C. or less, is 0.1 mass % or more and 3.0 mass % or less.

5. The branched propylene-based polymer according to claim 1, further having the following property (8):

property (8): a melting point (Tm) measured by differential scanning calorimetry (DSC) is more than 150.0° C. and less than 160.0° C.

6. The branched propylene-based polymer according to claim 1, further having the following property (9):

property (9): a number of long-chain branches measured by $^{13}$C-NMR is 0.1/1000 monomers or more and 0.5/1000 monomers or less.

7. A method for producing the branched propylene-based polymer defined by claim 1, wherein propylene is homopolymerized or copolymerized with a comonomer in the presence of a propylene polymerization catalyst comprising the following components [A-1], [A-2], [B] and [C]:

component [A-1]: a metallocene compound which gives, when the propylene is homopolymerized at 70° C., a propylene homopolymer a-1 having a terminal vinyl rate (Rv) of 0.5 or more, component [A-2]: a metallocene compound which gives, when the propylene is homopolymerized at 70° C., a propylene homopolymer a-2 having a larger weight average molecular weight than the propylene homopolymer a-1 and having a terminal vinyl rate (Rv) of less than 0.5, component [B]: a compound or layered silicate which is reactive with the components [A-1] and [A-2] to form an ion pair, and component [C]: an organoaluminum compound.

8. The method for producing the branched propylene-based polymer according to claim 7, wherein the propylene is homopolymerized or copolymerized with the comonomer by keeping a hydrogen concentration constant.

9. The method for producing the branched propylene-based polymer according to claim 7, wherein the propylene is homopolymerized or copolymerized with the comonomer by keeping the hydrogen concentration constant by continuously introducing hydrogen and the propylene into a polymerization reactor and keeping a ratio between an amount of the introduced hydrogen and that of the introduced propylene constant.

* * * * *